(12) United States Patent
Loftus-Vergari et al.

(10) Patent No.: US 12,446,938 B2
(45) Date of Patent: Oct. 21, 2025

(54) ORTHOPEDIC FIXATION SYSTEM

(71) Applicant: DEPUY SYNTHES PRODUCTS, INC., Raynham, MA (US)

(72) Inventors: Jeffrey Loftus-Vergari, Media, PA (US); Danielle Rossi, San Francisco, CA (US); Daniel Cheney, Downington, PA (US); Philip Watt, New Holland, PA (US); Jordan Conley, Wilmington, DE (US)

(73) Assignee: DePuy Synthes Products, Inc., Raynham, MA (US)

( * ) Notice: Subject to any disclaimer, the term of this patent is extended or adjusted under 35 U.S.C. 154(b) by 304 days.

(21) Appl. No.: 18/096,403

(22) Filed: Jan. 12, 2023

(65) Prior Publication Data
US 2024/0238020 A1 Jul. 18, 2024

(51) Int. Cl.
*A61B 17/80* (2006.01)
*A61B 17/064* (2006.01)
(Continued)

(52) U.S. Cl.
CPC ........ *A61B 17/809* (2013.01); *A61B 17/0642* (2013.01); *A61B 17/8004* (2013.01);
(Continued)

(58) Field of Classification Search
CPC ........ A61B 2017/0641; A61B 17/0642; A61B 2017/0645; A61B 2017/681;
(Continued)

(56) References Cited

U.S. PATENT DOCUMENTS

| 4,906,189 A | 3/1990 | Knapp |
| 5,662,655 A | 9/1997 | Laboureau et al. |

(Continued)

FOREIGN PATENT DOCUMENTS

| WO | 2015026357 A1 | 2/2015 |
| WO | 2015131106 A1 | 9/2015 |

(Continued)

OTHER PUBLICATIONS

International Search Report for PCT/IB2024/050059, Issued Mar. 25, 2024 for PCT Application Counterpart to U.S. Appl. No. 18/096,403.

*Primary Examiner* — Larry E Waggle, Jr.
(74) *Attorney, Agent, or Firm* — Christopher L. Makay

(57) ABSTRACT

An orthopedic fixation system including an orthopedic implant transitionable between a natural shape and an insertion shape. The orthopedic implant includes a bridge deformable to move the orthopedic implant between the natural shape and the insertion shape, a claw extending from the bridge at a first end thereof, and an anchor extending from the bridge at a second end thereof. The orthopedic implant when in the insertion shape affixes a bone fragment and a bone in that the anchor implants in the bone, the bridge extends over the bone and the bone fragment to position the claw at the bone fragment, and the claw captures the bone fragment. Moreover, upon an attempted transition of the orthopedic implant from the insertion shape to the natural shape, the orthopedic implant delivers energy stored therein to the bone fragment and the bone thereby affixing the bone fragment with the bone.

25 Claims, 19 Drawing Sheets

(51) Int. Cl.
*A61B 17/84* (2006.01)
*A61B 17/17* (2006.01)
*A61B 17/68* (2006.01)

(52) U.S. Cl.
CPC ............ *A61B 17/808* (2013.01); *A61B 17/84* (2013.01); *A61B 2017/0645* (2013.01); *A61B 17/17* (2013.01); *A61B 2017/681* (2013.01)

(58) Field of Classification Search
CPC .............. A61B 17/8004; A61B 17/809; A61B 17/8872; A61B 17/808
See application file for complete search history.

(56) References Cited

U.S. PATENT DOCUMENTS

| | | | |
|---|---|---|---|
| 5,779,707 A | 7/1998 | Bertholet et al. | |
| 6,616,669 B2 | 9/2003 | Ogilvie et al. | |
| 6,773,437 B2 | 8/2004 | Ogilvie et al. | |
| 8,394,097 B2 | 3/2013 | Peyrot et al. | |
| 8,409,258 B2 | 4/2013 | Aubin et al. | |
| 8,454,653 B2 | 6/2013 | Hadba et al. | |
| 8,475,456 B2 | 7/2013 | Augoyard et al. | |
| 8,579,938 B2 | 11/2013 | Heinrich et al. | |
| 8,596,514 B2 * | 12/2013 | Miller ................ | A61B 17/0682 227/181.1 |
| 8,679,123 B2 | 3/2014 | Kinmon et al. | |
| 8,679,154 B2 | 3/2014 | Smith et al. | |
| 8,679,156 B2 | 3/2014 | Smith et al. | |
| 8,715,325 B2 | 5/2014 | Weiner et al. | |
| 8,721,646 B2 | 5/2014 | Fox | |
| 8,808,380 B2 | 8/2014 | Fox et al. | |
| D728,104 S | 4/2015 | Katchis et al. | |
| 9,017,331 B2 | 4/2015 | Fox | |
| 9,056,014 B2 | 6/2015 | McCormick et al. | |
| 9,101,399 B2 | 8/2015 | Kartalian et al. | |
| 9,125,698 B2 | 9/2015 | Miller | |
| 9,161,789 B2 | 10/2015 | Peyrot et al. | |
| 9,283,007 B2 | 3/2016 | Augoyard et al. | |
| 9,339,268 B2 | 5/2016 | Fox | |
| 9,387,093 B2 | 7/2016 | Biedermann et al. | |
| 9,393,058 B2 | 7/2016 | Aubin et al. | |
| 9,402,624 B1 | 8/2016 | Scott et al. | |
| 9,451,955 B2 | 9/2016 | Fox | |
| 9,451,957 B2 | 9/2016 | Fox | |
| 9,474,525 B1 | 10/2016 | Smith et al. | |
| 9,486,212 B2 | 11/2016 | Miller et al. | |
| 9,492,215 B2 | 11/2016 | Augoyard et al. | |
| 9,554,915 B2 | 1/2017 | McCormick et al. | |
| 9,615,873 B2 | 4/2017 | Weiner et al. | |
| 9,693,771 B2 | 7/2017 | Heinrich et al. | |
| 9,700,306 B2 | 7/2017 | Smith et al. | |
| 9,724,138 B2 | 8/2017 | Palmer et al. | |
| 9,743,926 B2 | 8/2017 | Fox | |
| 9,808,296 B2 | 11/2017 | McCormick | |
| 9,848,931 B2 | 12/2017 | Kartalian et al. | |
| 9,855,036 B2 | 1/2018 | Palmer et al. | |
| 9,872,681 B2 | 1/2018 | Miller et al. | |
| 9,883,897 B2 | 2/2018 | Taber | |
| 9,901,338 B2 | 2/2018 | Anderson | |
| 9,907,585 B2 | 3/2018 | Fox | |
| 2003/0139746 A1 | 7/2003 | Groiso | |
| 2008/0065153 A1 | 3/2008 | Allard et al. | |
| 2008/0065154 A1 | 3/2008 | Allard et al. | |
| 2010/0063506 A1 | 3/2010 | Fox et al. | |
| 2013/0030437 A1 | 1/2013 | Fox | |
| 2013/0231667 A1 | 9/2013 | Taylor et al. | |
| 2014/0018809 A1 | 1/2014 | Allen | |
| 2014/0358235 A1 | 12/2014 | Fox et al. | |
| 2015/0127004 A1 | 5/2015 | Patil | |
| 2015/0133940 A1 | 5/2015 | Palmer et al. | |
| 2015/0230843 A1 | 8/2015 | Palmer et al. | |
| 2015/0238237 A1 | 8/2015 | Madjarov | |
| 2015/0257801 A1 | 9/2015 | Palmer et al. | |
| 2015/0265325 A1 | 9/2015 | Matheny | |
| 2015/0282819 A1 | 10/2015 | Austin et al. | |
| 2016/0000490 A1 | 1/2016 | Kartalian et al. | |
| 2016/0135808 A1 | 5/2016 | Anderson | |
| 2016/0192931 A1 | 7/2016 | Hester et al. | |
| 2016/0199060 A1 | 7/2016 | Morgan et al. | |
| 2016/0213412 A1 | 7/2016 | Palmer et al. | |
| 2016/0278825 A1 | 9/2016 | Fox | |
| 2016/0296263 A1 | 10/2016 | Champagne et al. | |
| 2016/0296264 A1 | 10/2016 | Champagne et al. | |
| 2016/0317198 A1 | 11/2016 | Fox | |
| 2016/0338697 A1 | 11/2016 | Biedermann et al. | |
| 2017/0007305 A1 | 1/2017 | Hollis et al. | |
| 2017/0100121 A1 | 4/2017 | Miller et al. | |
| 2017/0100163 A1 | 4/2017 | Palmer et al. | |
| 2017/0100171 A1 | 4/2017 | Palmer et al. | |
| 2017/0100273 A1 | 4/2017 | McCormick et al. | |
| 2017/0172634 A1 | 6/2017 | Palmer et al. | |
| 2017/0181779 A1 | 6/2017 | Leither et al. | |
| 2017/0189090 A1 | 7/2017 | Champagne et al. | |
| 2017/0196604 A1 | 7/2017 | Hartdegen et al. | |
| 2017/0231625 A1 | 8/2017 | Handie | |
| 2017/0238926 A1 | 8/2017 | Miller et al. | |
| 2017/0238981 A1 | 8/2017 | Madjarov et al. | |
| 2017/0252036 A1 | 9/2017 | Palmer et al. | |
| 2017/0265862 A1 | 9/2017 | Smith et al. | |
| 2017/0296243 A1 | 10/2017 | Dunaway et al. | |
| 2017/0303978 A1 | 10/2017 | Palmer et al. | |
| 2017/0319247 A1 | 11/2017 | Palmer et al. | |
| 2017/0347999 A1 | 12/2017 | Palmer et al. | |
| 2018/0008263 A1 | 1/2018 | Goldstein et al. | |
| 2018/0030580 A1 | 2/2018 | Ayers | |
| 2020/0000465 A1 * | 1/2020 | Maclure ............. | A61B 17/0644 |
| 2021/0177470 A1 | 6/2021 | Wiater | |
| 2021/0228364 A1 * | 7/2021 | Cheney ............. | A61B 17/0642 |
| 2022/0015812 A1 | 1/2022 | Cheney et al. | |
| 2022/0061837 A1 | 3/2022 | Ritz et al. | |

FOREIGN PATENT DOCUMENTS

| | | |
|---|---|---|
| WO | 2015176600 A1 | 11/2015 |
| WO | 2017207922 A1 | 12/2017 |

* cited by examiner

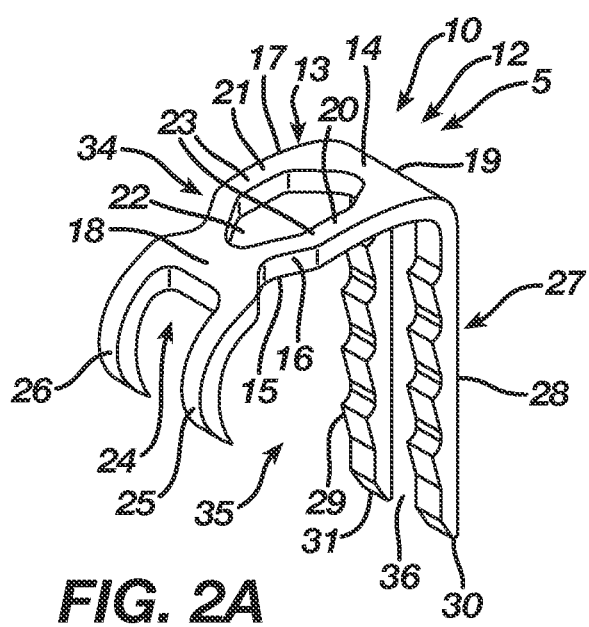
FIG. 2A
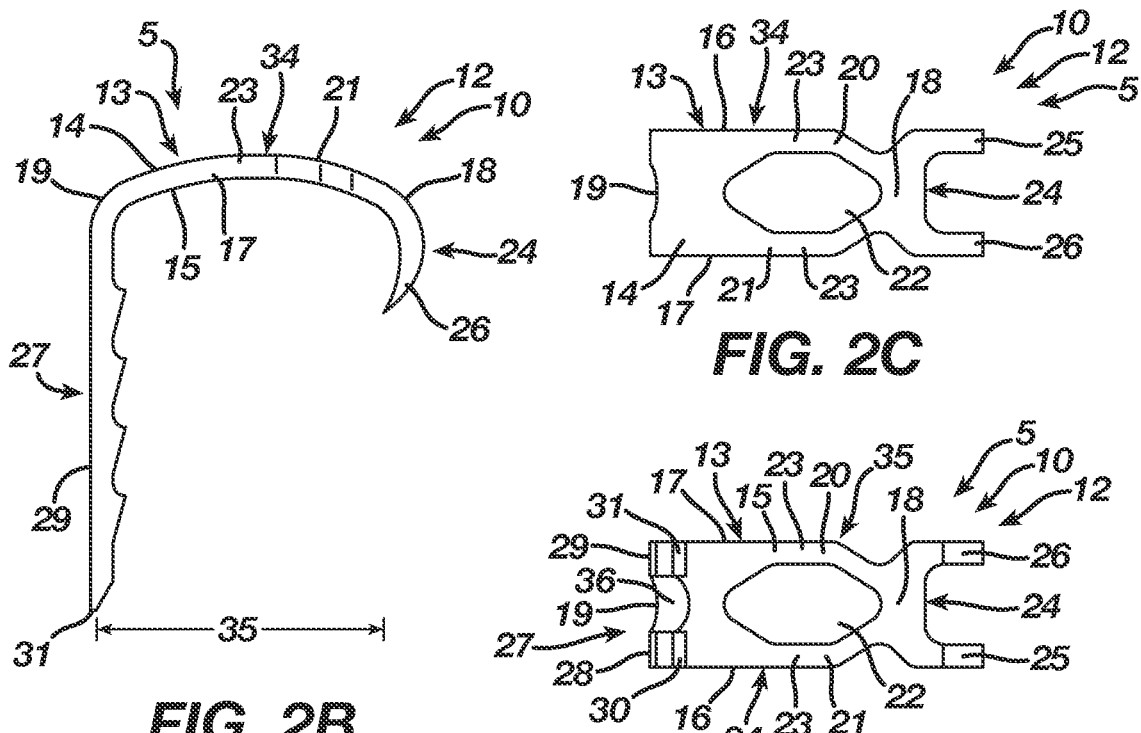
FIG. 2B
FIG. 2C
FIG. 2D

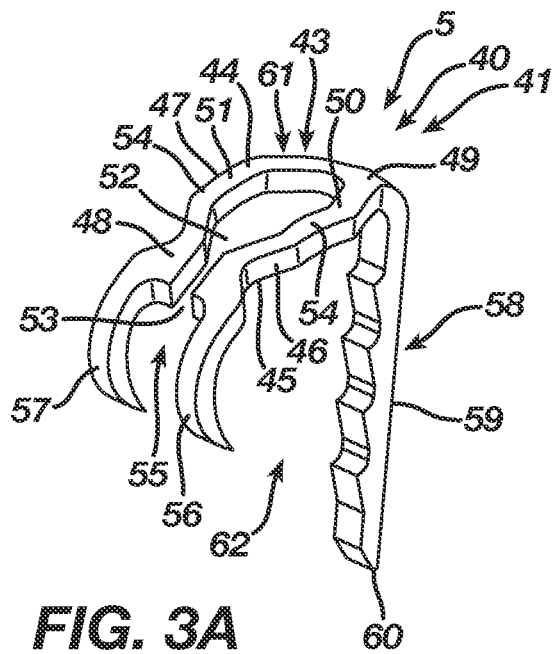
FIG. 3A
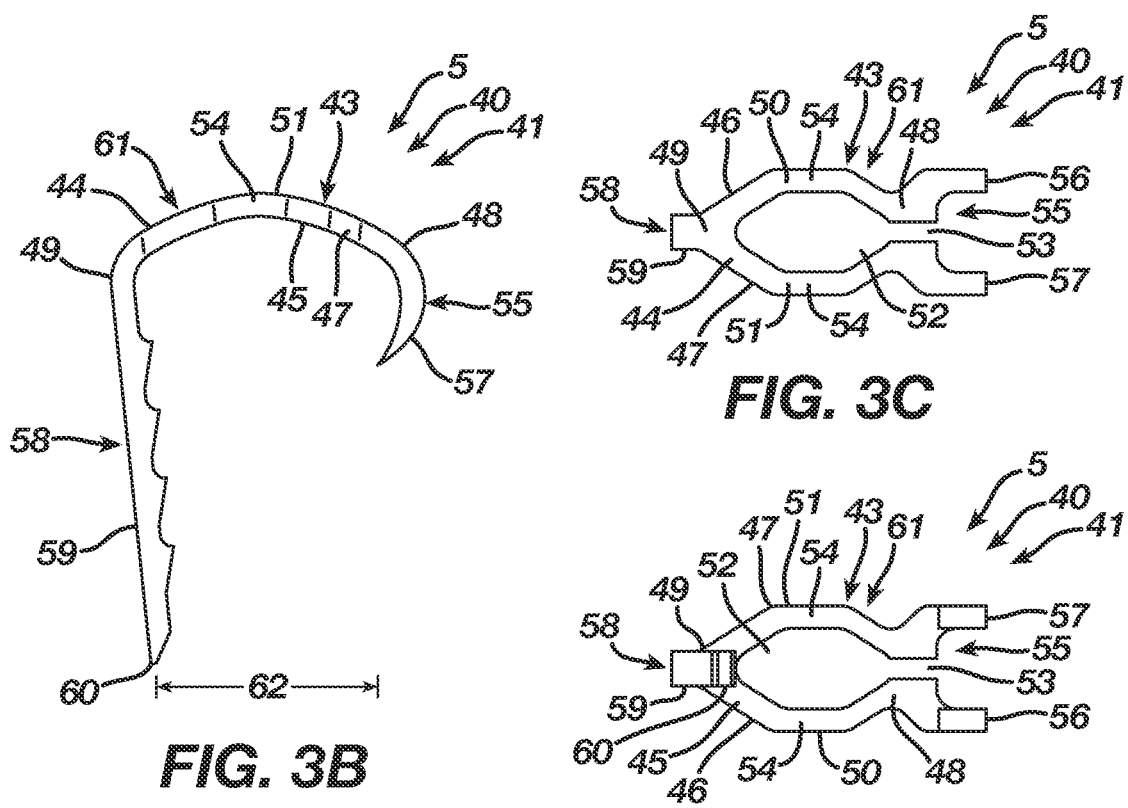
FIG. 3B
FIG. 3C
FIG. 3D

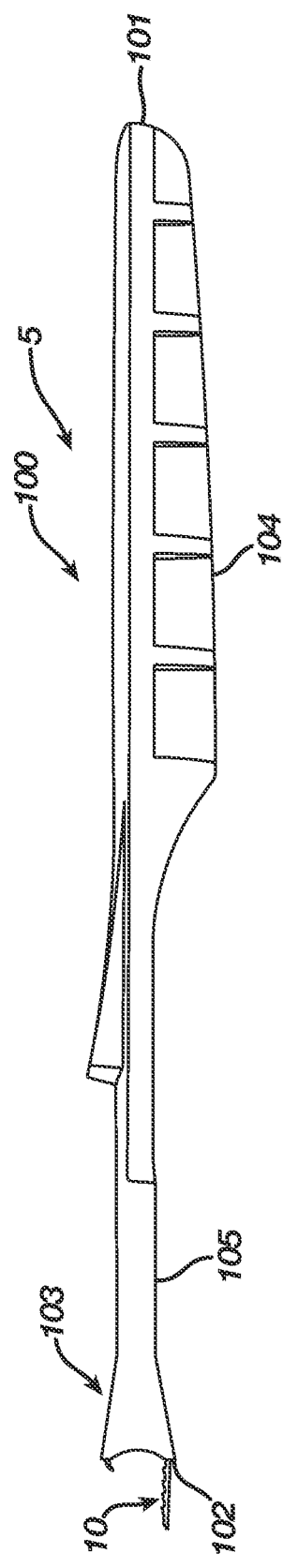
FIG. 8A
FIG. 8B

ORTHOPEDIC FIXATION SYSTEM

BACKGROUND OF THE INVENTION

1. Field of the Invention

The present invention relates generally to orthopedic fixation of bone and, more particularly, but not way of limitation, to an orthopedic fixation system including an orthopedic implant configured to capture and compress bone fragments and associated implant insertion instruments.

2. Description of the Related Art

Bone fractures often involve complex fractures where extensive fragmentation occurs, such as, for example, in distal radius fractures. Systems to capture and fixate bone fragments created as a result of a bone experiencing a complex bone fracture include a bone plate and associated bone screws that secure the bone plate with the fractured bone. While bone plate and screw constructs adequately cover many bone fracture patterns sustained by a bone during a complex bone fracture, current bone plates and associated screws are incapable of addressing certain bone fracture patterns. Illustratively, some bone fracture patterns are extremely complex and include bone fragments that are too small and thin to capture with a current bone plate and associated screws. Moreover, some bone fracture patterns occur outside of the range of current bone plate and screw constructs, such as, for example, in a distal radius fracture where distal volar fragments exist on the ulnar side of the distal radius.

Accordingly, an orthopedic fixation system including an orthopedic implant and associated implant insertion instruments that enables a capture and compression of bone fragments while also presenting a low profile that reduces a likelihood of tendon irritation or rupture and further may be used in conjunction with a bone plate will provide an improvement in bone fixation.

SUMMARY OF THE INVENTION

In accordance with the present invention, an orthopedic fixation system includes an orthopedic implant transitionable between a natural shape and an insertion shape. A transition of the orthopedic implant from the natural shape to the insertion shape stores deliverable energy. Conversely, a transition of the orthopedic implant from the insertion shape to the natural shape delivers stored energy.

The orthopedic implant includes a bridge, a claw, and an anchor. The bridge includes a first end and a second end with a first span and a second span therebetween. The first span and the second span are spaced apart to define an opening therebetween. The bridge at the first span and the second span is deformable to move the orthopedic implant between the natural shape and the insertion shape. The claw extends from the bridge at the first end thereof. The claw preferably includes a first hook and a second hook extending from the bridge at the first end thereof. The anchor extends from the bridge at the second end thereof. The anchor includes either a leg extending from the bridge at the second end thereof or a first leg and a second leg extending from the bridge at the second end thereof.

The orthopedic implant, when transitioned to the insertion shape, affixes a bone fragment and a bone in that the anchor in the form of the leg or the first leg and the second leg implants in the bone while the bridge extends over the bone and the bone fragment to position the claw at the bone fragment. Moreover, the claw in the form of the first hook and the second hook captures the bone fragment such that, upon an attempted transition of the orthopedic implant from the insertion shape to the natural shape, the orthopedic implant delivers the energy stored therein to the bone fragment and the bone thereby affixing the bone fragment with the bone.

In a first embodiment of the orthopedic implant, the first span and the second span, which each include a transition section therein, connect at the first end of the bridge and at the second end of the bridge. The first hook extends from the bridge at the first end adjacent the first span thereof, and the second hook extends from the bridge at the first end adjacent the second span thereof. The first leg extends from the bridge at the second end adjacent the first span thereof, and the second leg extends from the bridge at the second end adjacent the second span thereof.

The transition sections of the first and second spans respectively locate the first and second spans in a natural form such that the orthopedic implant in the natural shape includes the claw and the anchor residing at a first distance. Conversely, the transition sections of the first and second spans are deformable to store energy while moving respectively the first and second spans from the natural form to an insertion form such that the orthopedic implant in the insertion shape includes the claw and the anchor residing at a second distance that is greater than the first distance. The first span and the second span are configured to extend over the bone and the bone fragment to position the claw in the form of the first hook and the second hook at the bone fragment such that, upon the transition sections of the first and second spans attempting to transition respectively the first span and the second span from the insertion form to the natural form, the orthopedic implant, in attempting to transition from the insertion shape to the natural shape, delivers the energy stored therein to the bone fragment and the bone thereby affixing the bone fragment with the bone.

In a second embodiment, the first span and the second span, which each include a transition section therein, define a slot therebetween at the first end of the bridge, whereas the first span and the second span connect at the second end of the bridge. The first hook extends from the bridge at the first end adjacent the first span thereof, and the second hook extends from the bridge at the first end adjacent the second span thereof. The leg extends from the bridge at the second end. In an alternative of the second embodiment, the leg is non-linear whereby a first leg segment extends from the bridge at the second end thereof and a second leg segment extends from the first leg segment at an angle that locates the second leg segment beneath the bridge.

The transition sections of the first and second spans, due to the slot, independently locate, respectively, the first span and the second span in a natural form such that the orthopedic implant in the natural shape includes the claw and the anchor residing at a first distance. Conversely, the transition sections of the first and second spans are deformable to store energy while, due to the slot, independently move, respectively, the first span and the second span from the natural form to an insertion form such that the orthopedic implant in the insertion shape includes the claw and the anchor residing at a second distance that is greater than the first distance. The first span and the second span are configured to extend over the bone and the bone fragment to position the claw in the form of the first hook and the second hook at the bone fragment such that, upon the transition sections of the first and second spans attempting to independently transition, respectively, the first span and the second span from the insertion form to the natural form, the orthopedic implant in attempting to transition from the insertion shape to the natural shape delivers the energy stored therein to the bone fragment and the bone thereby affixing the bone fragment with the bone.

In a third embodiment, the first span, which includes a transition section therein, and the second span connect at the first end of the bridge and at the second end of the bridge. The second span includes a slot therein that divides the second span into a first span segment and a second span segment. The first hook extends from the bridge at the first end adjacent the first span thereof, and the second hook extends from the bridge at the first end adjacent the second span thereof. The leg extends from the bridge at the second end.

The first span at the transition section thereof closes the first span segment and the second span segment whereby the first span and the second span are located in a natural form such that the orthopedic implant in the natural shape includes the claw and the anchor residing at a first distance. The first span at the transition section thereof, during a deformation to store energy, is pivotable to open the first span segment and the second span segment whereby the first span and the second span move from the natural form to an insertion form such that the orthopedic implant in the insertion shape includes the claw and the anchor residing at a second distance that is greater than the first distance. The first span and the second span extend over the bone and the bone fragment to position the claw in the form of the first hook and the second hook at the bone fragment such that, upon the transition section of the first span attempting to transition the first span and the second span from the insertion form to the natural form, the orthopedic implant in attempting to transition from the insertion shape to the natural shape delivers the energy stored therein to the bone fragment and the bone thereby affixing the bone fragment with the bone.

The orthopedic fixation system includes an implant delivery device having a handle with a shaft extending therefrom whereby the shaft terminates in an implant grip. The implant is configured such that, upon transition of the orthopedic implant from the natural shape to the insertion shape, the implant grip engages the bridge thereby constraining the bridge and holding the orthopedic implant in the insertion shape while the claw and the anchor extend from the implant grip.

The implant grip includes first and second side walls and first and second end walls defining a cavity having an entrance. The implant grip further includes a first resilient retention tab extending from the first side wall into the cavity at the entrance thereof and a second resilient retention tab extending from the second side wall into the cavity at the entrance thereof. The first and second resilient retention tabs, upon a pushing of the implant grip against the bridge of the orthopedic implant transitioned to the insertion shape, are movable away from the entrance and into the cavity such that the bridge by-passes the first and second resilient retention tabs and enters the cavity. Once the bridge enters the cavity, the first and second resilient retention tabs return from the cavity to the entrance thereby securing the bridge in the cavity and holding the orthopedic implant in the insertion shape while the claw and legs extend from the implant grip. The first and second resilient retention tabs, upon a pulling of the implant grip relative to the bridge of the orthopedic implant held by the implant grip in the insertion shape, are movable away from the entrance and the cavity such that the bridge by-passes the first and second resilient retention tabs and exits the cavity. Once the bridge exits the cavity, the first and second resilient retention tabs return to the entrance of the cavity thereby releasing the orthopedic implant from the implant grip.

The orthopedic fixation system includes a bone holding device having a claw. The claw includes a first hook and a second hook extending from opposite ends of a crosspiece such that the first hook and the second hook define a slot therebetween. The claw further includes a first boss connected with the first hook and a second boss connected with the second hook. The first and second bosses each include a passage configured to receive therethrough a pin. The crosspiece seats atop the bone, whereas the first hook and the second hook extend across the bone and the bone fragment in order to capture the bone fragment. The first boss at the passage thereof receives a pin therethrough that secures the first hook with the bone fragment, while the second boss at the passage thereof receives a pin therethrough that secures the second hook with the bone. After securing the first hook with the bone fragment and the second hook with the bone, the claw holds the bone fragment against the bone.

The orthopedic fixation system includes a drill guide having a handle, a shank extending from the handle, and a template extending from the shank. The template in a first embodiment defines a guide hole and in a second embodiment defines first and second guide holes. The template is configured to fit within the slot between the first and second hooks of the claw such that template positions the guide hole or the first and second guide holes adjacent the crosspiece of the claw in order to locate the guide hole or first and second guide holes over the bone.

It is therefore an object of the present invention to provide an orthopedic fixation system including an orthopedic implant that enables a capture and compression of a bone fragment or fragments.

It is another object of the present invention to provide an orthopedic fixation system including an orthopedic implant with a low-profile that reduces tendon irritation or rupture and further may be used in conjunction with a bone plate.

It is a further object of the present invention to provide an orthopedic fixation system including an orthopedic implant and associated implant insertion instruments.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

BRIEF DESCRIPTION OF DRAWINGS

FIG. 2A is an isometric view illustrating the orthopedic implant according to the first embodiment in an insertion shape.

FIG. 2B is a side view illustrating the orthopedic implant according to the first embodiment in the insertion shape.

FIG. 2C is a top view illustrating the orthopedic implant according to the first embodiment in the insertion shape.

FIG. 2D is a bottom view illustrating the orthopedic implant according to the first embodiment in the insertion shape.

FIG. 3A is an isometric view illustrating an orthopedic implant according to a second embodiment in a natural shape.

FIG. 3B is a side view illustrating the orthopedic implant according to the second embodiment in the natural shape.

FIG. 3C is a top view illustrating the orthopedic implant according to the second embodiment in the natural shape.

FIG. 3D is a bottom view illustrating the orthopedic implant according to the second embodiment in the natural shape.

FIG. 8A is a front view illustrating an implant insertion device loaded with an orthopedic implant according to the first embodiment in the insertion shape.

FIG. 8B is a side view illustrating the implant insertion device loaded with the orthopedic implant according to the first embodiment in the insertion shape.

DETAILED DESCRIPTION OF THE PREFERRED EMBODIMENT

Figure 1A:
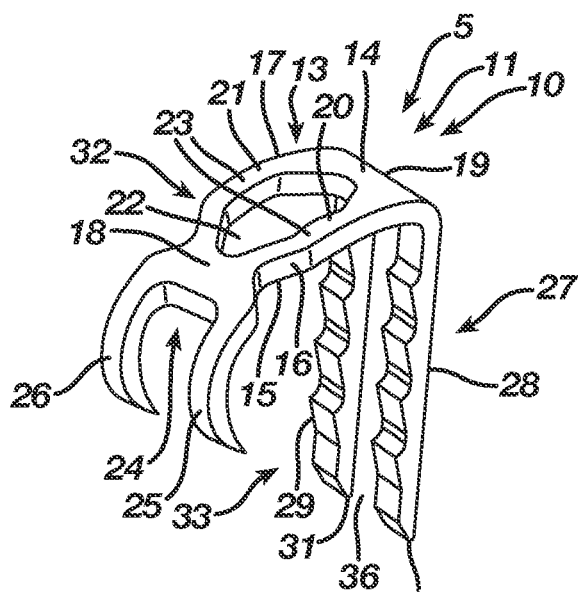
FIG. 1A is an isometric view illustrating an orthopedic implant according to a first embodiment in a natural shape.
Figure 1B:
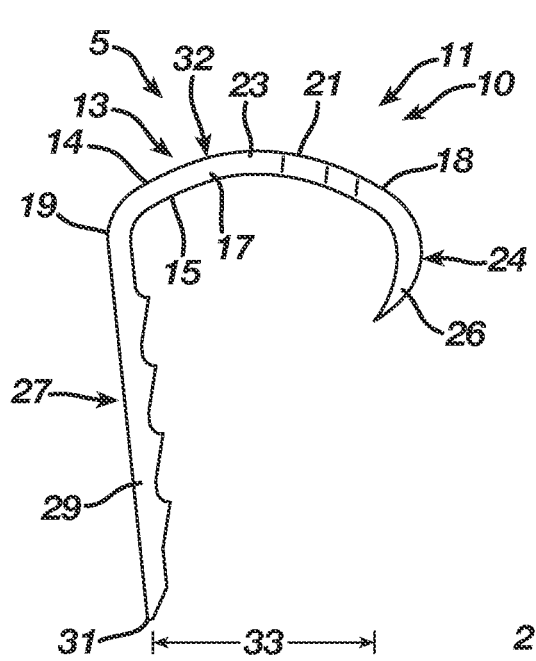
FIG. 1B is a side view illustrating the orthopedic implant according to the first embodiment in the natural shape.
Figure 1C:
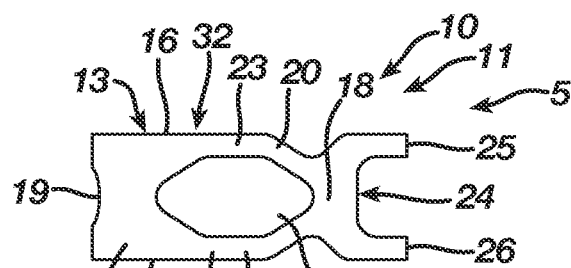
FIG. 1C is a top view illustrating the orthopedic implant according to the first embodiment in the natural shape.
Figure 1D:
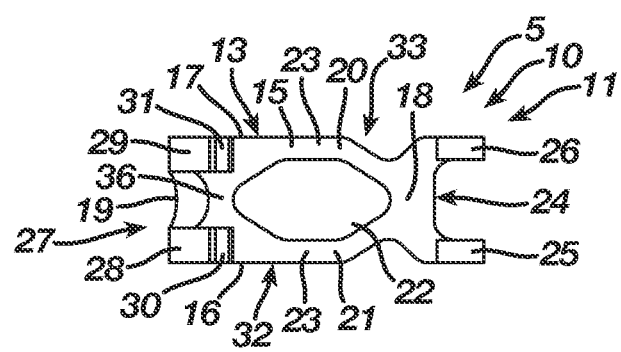
FIG. 1D is a bottom view illustrating the orthopedic implant according to the first embodiment in the natural shape.
Figure 4A:
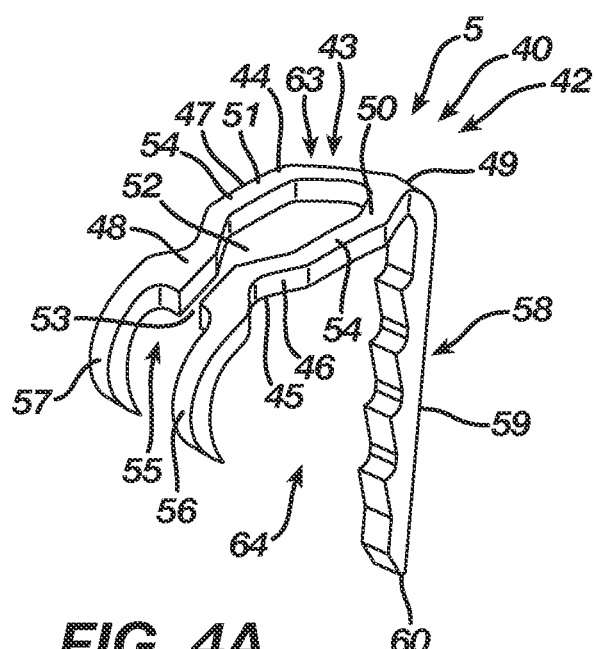
FIG. 4A is an isometric view illustrating the orthopedic implant according to the second embodiment in an insertion shape.
Figure 4B:
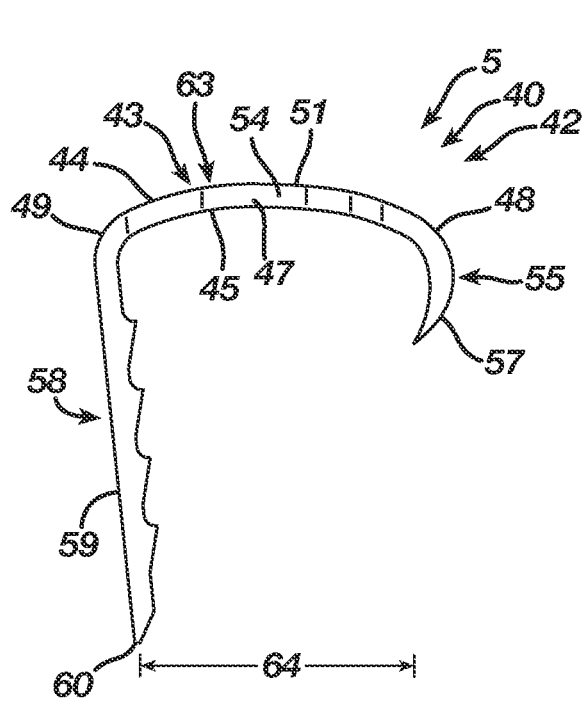
FIG. 4B is a side view illustrating the orthopedic implant according to the second embodiment in the insertion shape.
Figure 4C:
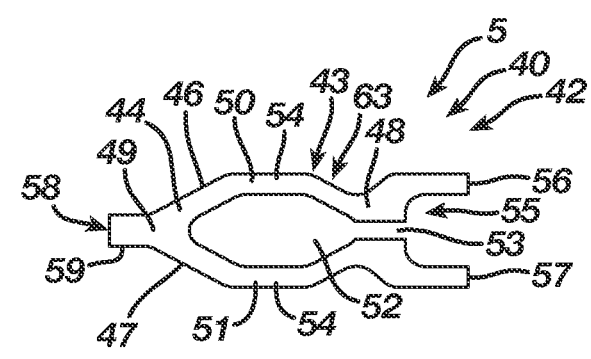
FIG. 4C is a top view illustrating the orthopedic implant according to the second embodiment in the insertion shape.
Figure 4D:
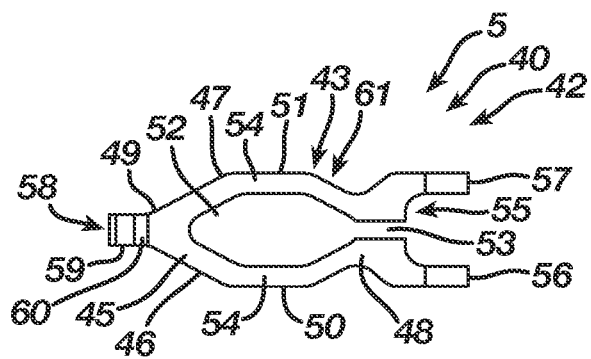
FIG. 4D is a bottom view illustrating the orthopedic implant according to the second embodiment in the insertion shape.

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

An orthopedic fixation system 5 includes an orthopedic implant 10 according to a first embodiment transitionable between a natural shape 11 as illustrated in FIGS. 1A-1D and an insertion shape 12 as illustrated in FIGS. 2A-2D. The implant 10 in the first embodiment may be manufactured from a shape memory material such that the implant 10 transitions between the natural shape 11 and the insertion shape 12. Shape memory materials suitable to implement the implant 10 include elastic biocompatible metals or metal alloys, such as, for example, titanium, stainless steel, and titanium alloy. Shape memory materials suitable to implement the implant 10 preferably include shape memory biocompatible metals or metal alloys with superelastic or temperature dependent properties, such as, for example, Nitinol. The implant 10 when deformed from the natural shape 11 to the insertion shape 12 stores energy deliverable to bone, bones, and/or bone fragments. In accordance with its manufacture from shape memory materials, the implant 10 begins in the natural shape 11, is transitionable to the insertion shape 12, and, once implanted in bone, bones, and/or bone fragments, attempts to transition from the insertion shape 12 to the natural shape 11 whereby the implant 10 delivers the energy stored therein to the bone, bones, and/or bone fragments in order to affix the bone, bones, and/or bone fragments and promote a healing thereof. In the first embodiment, attempted transition of the implant 10 from the insertion shape 12 to the natural shape 11 continuously compresses the bone, bones, and/or bone fragments to promote fusion thereof.

The implant 10 includes a bridge 13 with upper and lower surfaces 14 and 15, first and second sides 16 and 17, and first and second ends 18 and 19. The bridge 13 includes a first span 20 incorporating the first side 16 and a second span 21 incorporating the second side 17 whereby the first span 20 and the second span 21 are spaced apart to define an opening 22 in the bridge 13 between the first span 20 and the second span 21. The first span 20 and the second span 21 in the first embodiment are connected at the first end 18 and at the second end 19, and, more particularly, the first span 20 and the second span 21 converge and integrate at the first end 18 and at the second end 19. The implant 10 in the bridge 13 includes a transition section and more particularly in the first embodiment transition sections 23 located in the first span 20 and the second span 21 that facilitate transition of the implant 10 between the natural shape 11 and the insertion shape 12. The implant 10 includes a claw 24 extending from the bridge 13 at the first end 18 thereof configured to capture bone, bones, or bone fragments. The claw 24 in the first embodiment includes at least a first hook 25, which may be located centrally relative to the first end 18, and preferably a first hook 25 extending in a curve continuous from the first end 18 at the first side 16 of the bridge 13 to a tip of the first hook 25 and a second hook 26 extending in a curve continuous from the first end 18 at the second side 17 of the bridge 13 to a tip of the second hook 26. The implant 10 includes an anchor 27 extending from the bridge 13 at the second end 19 thereof configured to secure the implant 10 with bone or bones. The anchor 27 in the first embodiment includes at least a first leg 28, which may be located centrally relative to the second end 19, and preferably a first leg 28 extending from the second end 19 at the first side 16 and a second leg 29 extending from the second end 19 at the second side 17. The first leg 28 and the second leg 29 each have a respective tip 30 and 31 and may include barbs thereon that improve the pull-out resistance of the implant 10. The anchor 27 in the form of the first and second legs 28 and 29 secures the implant 10 with bone or bones while the bridge 13 extends over the bone or bones in order to position the claw 24 in the form of the first and second hooks 25 and 26 at a bone fragment or bone fragments such that the claw 24 captures the bone fragment or bone fragments. The implant 10, after capturing the bone fragment or bone fragments and an attempted transition thereof from the insertion shape 12 to the natural shape 11, delivers the energy stored therein to the bone fragment or bone fragments thereby affixing the bone fragment or bone fragments with the bone or bones.

The regular inherent shape of the implant 10, as illustrated in FIGS. 1A-1D, is the natural shape 11 where the transition sections 23 locate respectively the first and second spans 20 and 21 and thus the bridge 13 in a natural form 32 consisting of a closed or contracted/more angular profile whereby the claw 24 and the anchor 27 reside at a first distance 33. Nevertheless, as illustrated in FIGS. 2A-2D, the implant 10 is deformable, preferably under the action of superelasticity or temperature dependent shape memory, from the natural shape 11 to the insertion shape 12 where the transition sections 23 deform to store energy while also moving respectively the first and second spans 20 and 21 and thus the bridge 13 from the natural form 32 to an insertion form 34 which is an open or elongated/less angular profile whereby the claw 24 and the anchor 27 reside at a second distance 35 that is greater than the first distance 33. The first leg 28 and the second leg 29, particularly when the implant 10 resides in the insertion shape 12, are spaced apart at a distance 36. Since the insertion shape 12 is not the regular inherent shape of the implant 10, the bridge 13 typically is mechanically constrained using an implant insertion device whereby the implant insertion device maintains the bridge 13 and thus the first and second spans 20 and 21 in the insertion form 34. Illustratively, an implant insertion device, an example of which will be described in greater detail herein, couples with the implant 10 at the bridge 13 thereof such that the implant insertion device holds the bridge 13 and thus the first and second spans 20 and 21 in the insertion form 34, resulting in the implant insertion device constraining the deformed transition sections 23 in order to maintain the implant 10 in the insertion shape 12. After implantation into bone or bones including a capture of a bone fragment or fragments and a release of the implant insertion device, the implant 10 delivers the energy stored in the transition sections 23 whereby the first and second spans 20 and 21 and thus the bridge 13 attempt to transition from the insertion form 34 to the natural form 32 such that the implant 10, which attempts transition from the insertion shape 12 to the natural shape 11, affixes the bone fragment or fragments with the bone or bones through an application of a compressive force thereto.

When constrained in the insertion shape 11, such as, for example using an implant insertion device, the implant 10 is ready for securing with bone, bones, and/or bone fragments, and, in particular, with a bone and a bone fragment, which are presented herein as an example. A surgeon aligns the bone fragment with the bone at a fusion zone in an orientation that promotes fixation of the bone fragment with the bone and a proper healing thereof. Upon alignment of the bone fragment with the bone at the fusion zone, the surgeon forms drill holes in the bone configured to receive therein the first and second legs 28 and 29 of the implant 10. The surgeon then inserts the first and second legs 28 and 29 into the drill holes formed in the bone. Concurrent with the insertion of the first and second legs 28 and 29, the surgeon fits the claw 24 and thus the first and second hooks 25 and 26 over the bone fragment and positions the bridge 13 and thus the first and second spans 20 and 21 across the bone and the bone fragment with the transition sections 23 located proximate to the fusion zone. After securing the implant 10 with the bone fragment and the bone across the fusion zone, the surgeon releases the implant 10 resulting in the first and second spans 20 and 21 and thus the bridge 13 attempting to transition from the insertion form 34 to the natural form 32 and the implant 10 attempting to transition from the insertion shape 12 to the natural shape 11 whereby the implant 10 delivers the energy stored therein to the bone fragment and the bone at the fusion zone. In accordance therewith, the anchor 27 in the form of the first and second legs 28 and 29 secures the implant 10 with bone while at the same time the claw 24 in the form of the first and second hooks 25 and 26 fits over and then grasps the bone fragment thereby capturing the bone fragment and holding the bone fragment against the bone such that the implant 10 affixes the bone fragment with the bone through an application of a compressive force to the fusion zone.

The orthopedic fixation system 5 includes an orthopedic implant 40 according to a second embodiment transitionable between a natural shape 41 as illustrated in FIGS. 3A-3D and an insertion shape 42 as illustrated in FIGS. 4A-4D. The implant 40 in the second embodiment may be manufactured from a shape memory material such that the implant 40 transitions between the natural shape 41 and the insertion shape 42. Shape memory materials suitable to implement the implant 40 include elastic biocompatible metals or metal alloys, such as, for example, titanium, stainless steel, and titanium alloy. Shape memory materials suitable to implement the implant 40 preferably include shape memory biocompatible metals or metal alloys with superelastic or temperature dependent properties, such as, for example, Nitinol. The implant 40 when deformed from the natural shape 41 to the insertion shape 42 stores energy deliverable to bone, bones, and/or bone fragments. In accordance with its manufacture from shape memory materials, the implant 40 begins in the natural shape 41, is transitionable to the insertion shape 42, and, once implanted in bone, bones, and/or bone fragments, attempts to transition from the insertion shape 42 to the natural shape 41 whereby the implant 40 delivers the energy stored therein to the bone, bones, and/or bone fragments in order to affix the bone, bones, and/or bone fragments and promote a healing thereof. In the second embodiment, attempted transition of the implant 40 from the insertion shape 42 to the natural shape 41 continuously compresses the bone, bones, and/or bone fragments to promote fusion thereof.

The implant 40 includes a bridge 43 with upper and lower surfaces 44 and 45, first and second sides 46 and 47, and first and second ends 48 and 49. The bridge 43 includes a first span 50 incorporating the first side and a second span 51 incorporating the second side 47 whereby the first span 50 and the second span 51 are spaced apart to define an opening 52 in the bridge 13 between the first span 50 and the second span 51. The first span 50 and the second span 51 in the second embodiment define a slot 53 therebetween at the first end 48 of the bridge 53, and, more particularly, the first span 50 and the second span 51 converge toward the first end 48 of the bridge 53 without integrating to define the slot 53 therebetween. The first span 50 and the second span 51 further are connected at the second end 49 of the bridge 53, and, more particularly, the first span 50 and the second span 51 converge and integrate at the second end 49. The implant 40 in the bridge 43 includes a transition section and more particularly in the second embodiment transition sections 54 located in the first span 50 and the second span 51 that in combination with the inclusion of the slot 53 in the bridge 43 facilitate transition of the implant 40 between the natural shape 41 and the insertion shape 42. The implant 40 includes a claw 55 extending from the bridge 43 at the first end 48 thereof configured to capture bone, bones, or bone fragments. The claw 55 in the second embodiment includes at least a first hook 56, which may be located centrally relative to the first end 48, and preferably a first hook 56 extending from the first end 48 at the first side 46 and a second hook 57 extending from the first end 48 at the second side 47. The implant 40 includes an anchor 58 extending from the bridge 43 at the second end 49 thereof configured to secure the implant 40 with bone or bones. The anchor 58 in the second embodiment preferably includes a leg 59 located centrally relative to the second end 49. Nevertheless, the anchor 58 may include the leg 59 extending from the second end 49 at the first side 46 and a second leg extending from the second end 49 at the second side 47. The leg 59 has a tip 60 and may include barbs thereon that improve the pull-out resistance of the implant 40. The anchor 58 in the form of the leg 59 secures the implant 40 with bone or bones while the bridge 43 extends over the bone or bones in order to position the claw 55 in the form of the first and second hooks 56 and 57 at a bone fragment or bone fragments such that the claw 55 captures the bone fragment or bone fragments. The implant 40, after capturing the bone fragment or bone fragments and an attempted transition thereof from the insertion shape 42 to the natural shape 41, delivers the energy stored therein to the bone fragment or bone fragments thereby affixing the bone fragment or bone fragments with the bone or bones.

The regular inherent shape of the implant 40, as illustrated in FIGS. 3A-3D, is the natural shape 41 where the transition sections 54, in accordance with the inclusion of the slot 53 in the bridge 43, independently locate, respectively, the first and second spans 50 and 51 and thus the bridge 43 in a natural form 61 consisting of a closed or contracted/more angular profile whereby the claw 55 and the anchor 58 reside at a first distance 62. Nevertheless, as illustrated in FIGS. 4A-4D, the implant 40 is deformable, preferably under the action of superelasticity or temperature dependent shape memory, from the natural shape 41 to the insertion shape 42 where the transition sections 54, in accordance with the inclusion of the slot 53 in the bridge 43, deform to store energy while also independently moving, respectively, the first and second spans 50 and 51 and thus the bridge 43 from the natural form 61 to an insertion form 63 which is an open or elongated/less angular profile whereby the claw 55 and the anchor 58 reside at a second distance 64 that is greater than the first distance 62. Since the insertion shape 42 is not the regular inherent shape of the implant 40, the bridge 43 typically is mechanically constrained using an implant insertion device whereby the implant insertion device maintains the bridge 43 and thus the first and second spans 50 and 51 in the insertion form 63. Illustratively, an implant insertion device, an example of which will be described in greater detail herein, couples with the implant 40 at the bridge 43 thereof such that the implant insertion device holds the bridge 43 and thus the first and second spans 50 and 51 in the insertion form 63, resulting in the implant insertion device constraining the deformed transition sections 54 in order to maintain the implant 40 in the insertion shape 42. After implantation into bone or bones including a capture of a bone fragment or fragments and a release of the implant insertion device, the implant 40 delivers the energy stored in the transition sections 54 whereby the first and second spans 50 and 51 and thus the bridge 43 attempt to transition from the insertion form 63 to the natural form 61 such that the implant 40, which attempts transition from the insertion shape 42 to the natural shape 41, affixes the bone fragment or fragments with the bone or bones through an application of a compressive force thereto.

When constrained in the insertion shape 41, such as, for example using an implant insertion device, the implant 40 is ready for securing with bone, bones, and/or bone fragments, and, in particular, with a bone and a bone fragment, which are presented herein as an example. A surgeon aligns the bone fragment with the bone at a fusion zone in an orientation that promotes fixation of the bone fragment with the bone and a proper healing thereof. Upon alignment of the bone fragment with the bone at the fusion zone, the surgeon forms a drill hole in the bone configured to receive therein the leg 59 of the implant 40. The surgeon then inserts the leg 59 into the drill hole formed in the bone. Concurrent with the insertion of the leg 59, the surgeon fits the claw 55 and thus the first and second hooks 56 and 57 over the bone fragment and positions the bridge 43 and thus the first and second spans 50 and 51 across the bone and the bone fragment with the transition sections 54 located proximate to the fusion zone. After securing the implant 40 with the bone fragment and the bone across the fusion zone, the surgeon releases the implant 40 resulting in the first and second spans 50 and 51 and thus the bridge 43 attempting to transition from the insertion form 63 to the natural form 61 and the implant 40 attempting to transition from the insertion shape 42 to the natural shape 41 whereby the implant 40 delivers the energy stored therein to the bone fragment and the bone at the fusion zone. In accordance therewith, the anchor 58 in the form of the leg 59 secures the implant 40 with bone while at the same time the claw 55 in the form of the first and second hooks 56 and 57 fits over and then grasps the bone fragment thereby capturing the bone fragment and holding the bone fragment against the bone such that the implant 40 affixes the bone fragment with the bone through an application of a compressive force to the fusion zone.

Figure 5A:
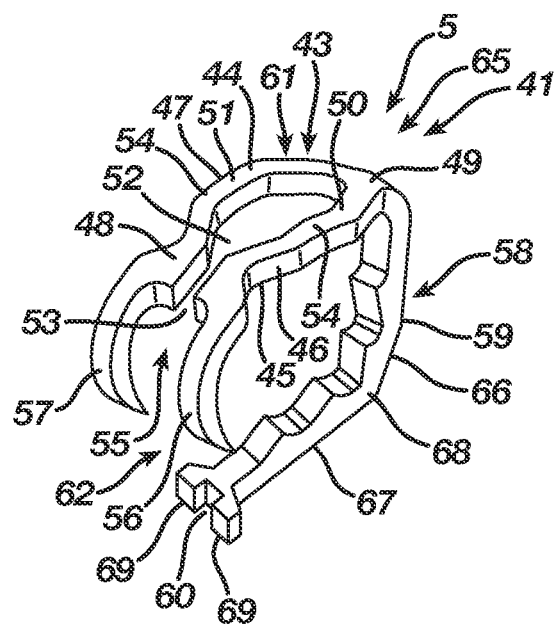
FIG. 5A is an isometric view illustrating an orthopedic implant according to an alternative of the second embodiment in a natural shape.
Figure 5B:
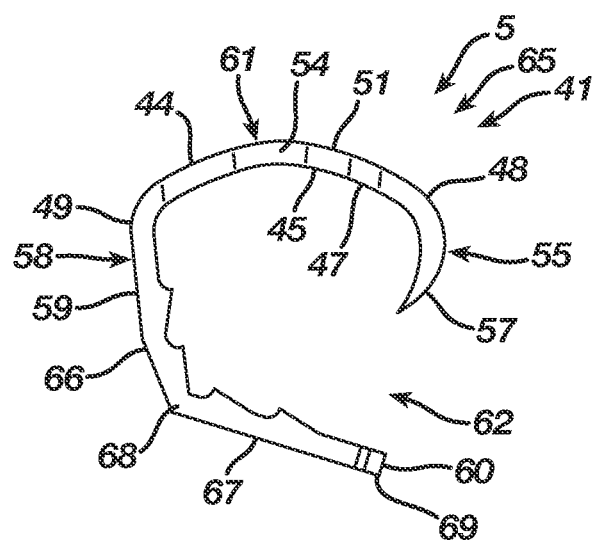
FIG. 5B is a side view illustrating the orthopedic implant according to an alternative of the second embodiment in the natural shape.
Figure 6A:
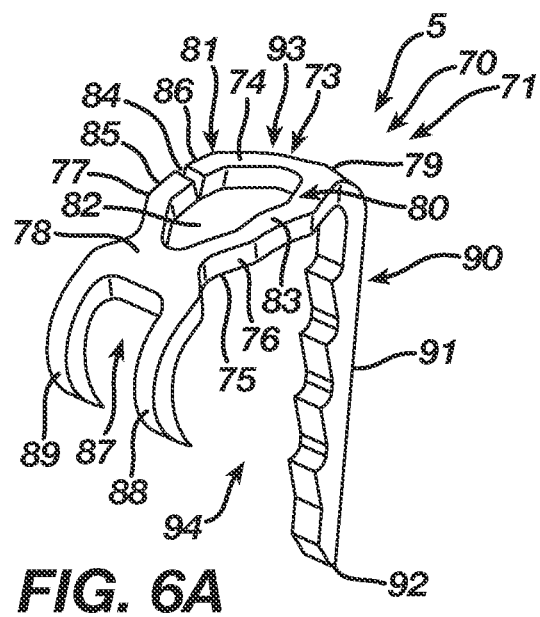
FIG. 6A is an isometric view illustrating an orthopedic implant according to a third embodiment in a natural shape.
Figure 6B:
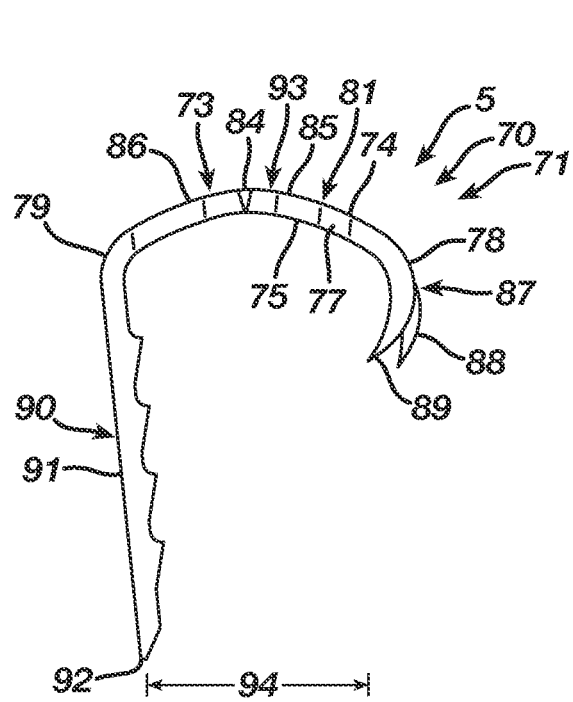
FIG. 6B is a side view illustrating the orthopedic implant according to the third embodiment in the natural shape.
Figure 6C:
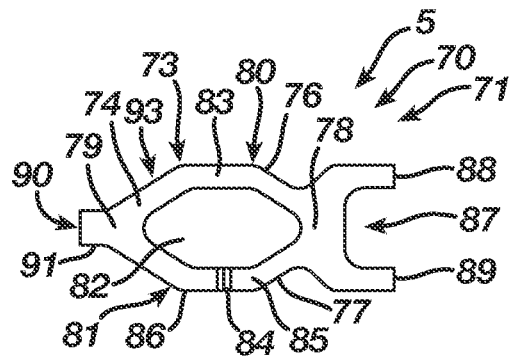
FIG. 6C is a top view illustrating the orthopedic implant according to the third embodiment in the natural shape.
Figure 6D:
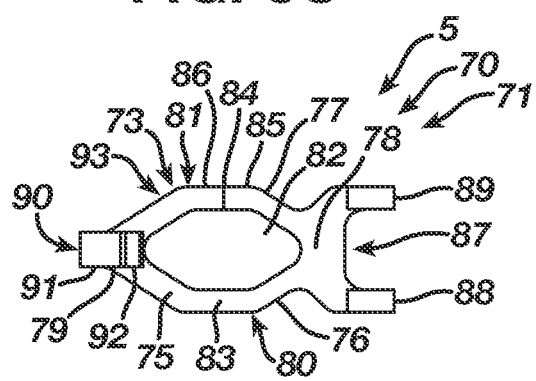
FIG. 6D is a bottom view illustrating the orthopedic implant according to the third embodiment in the natural shape.
Figure 7A:
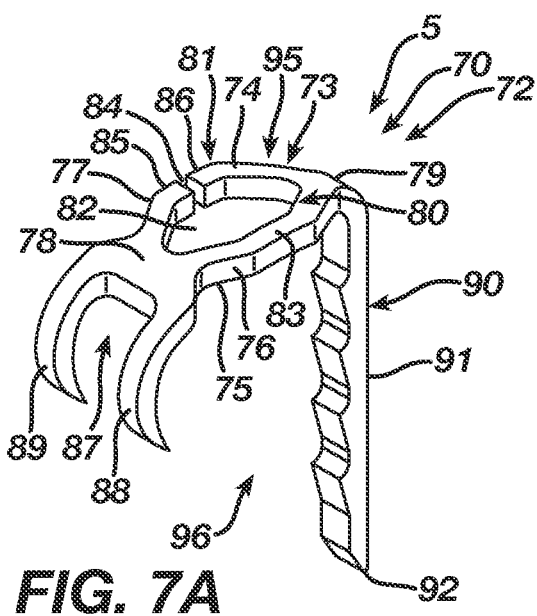
FIG. 7A is an isometric view illustrating the orthopedic implant according to the third embodiment in an insertion shape.
Figure 7B:
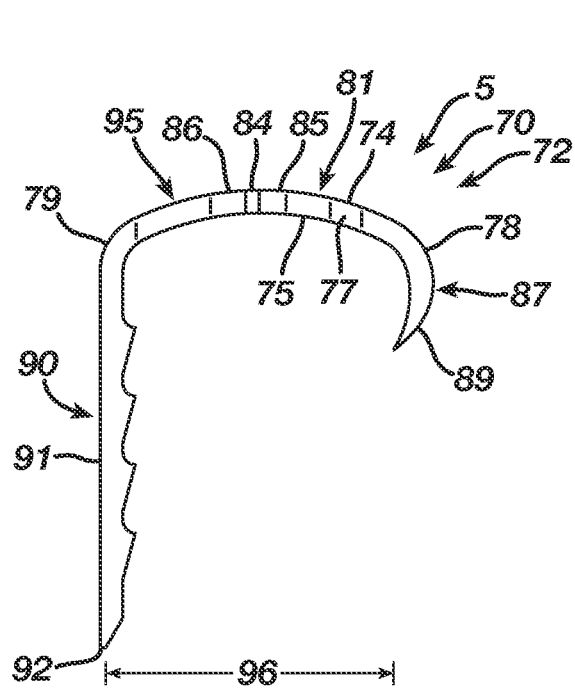
FIG. 7B is a side view illustrating the orthopedic implant according to the third embodiment in the insertion shape.
Figure 7C:
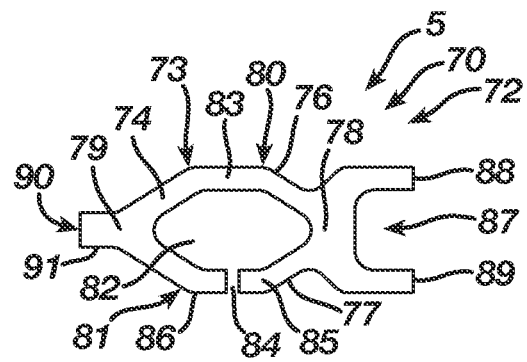
FIG. 7C is a top view illustrating the orthopedic implant according to the third embodiment in the insertion shape.
Figure 7D:
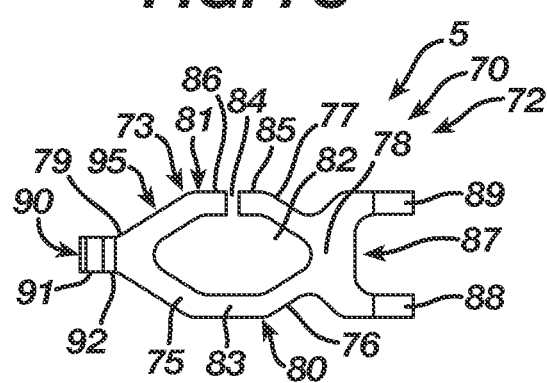
FIG. 7D is a bottom view illustrating the orthopedic implant according to the third embodiment in the insertion shape.
Figure 8C:
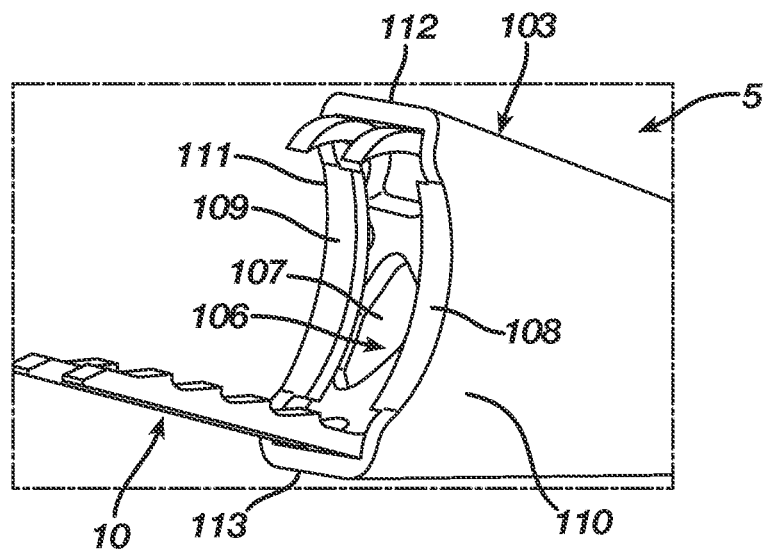
FIGS. 8C and 8D are perspective views illustrating the implant insertion device loaded with the orthopedic implant according to the first embodiment in the insertion shape.
Figure 8D:
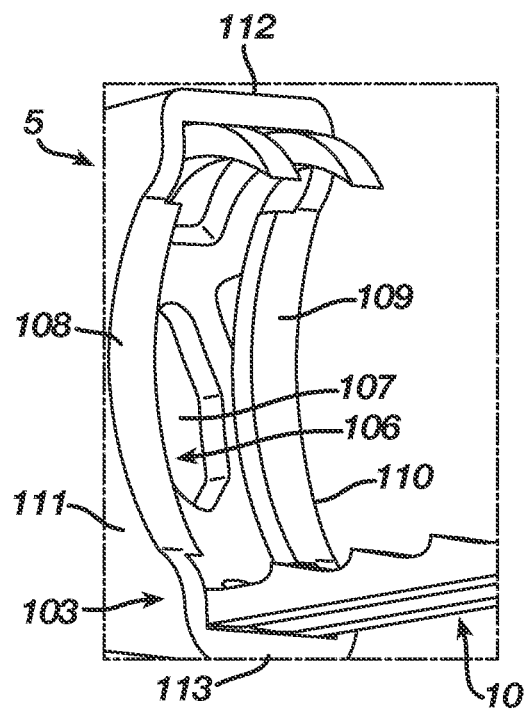
Figure 8E:
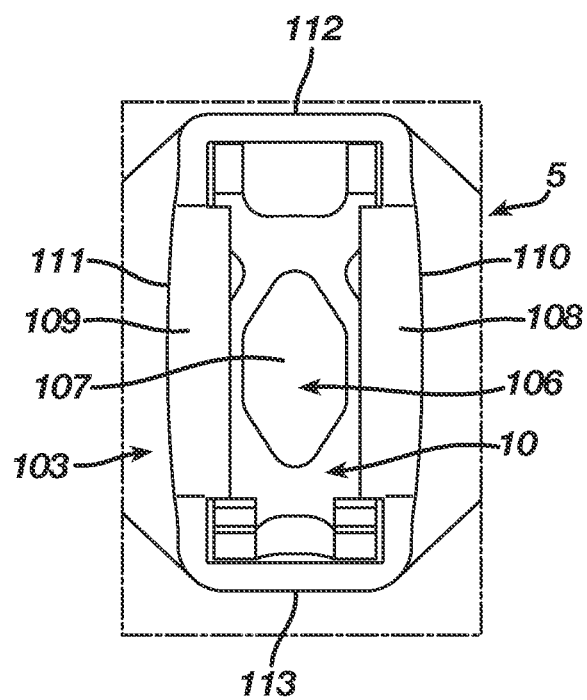
FIG. 8E is a bottom view illustrating the implant insertion device loaded with the orthopedic implant according to the first embodiment in the insertion shape.

FIGS. 5A-5B illustrate an orthopedic implant 65 alternative to the implant 40 of the second embodiment. The implant 65 is substantially similar in design and operation relative to the implant 40 according to the second embodiment such that, for the sake of brevity, only differences therebetween will be described herein. Moreover, one of ordinary skill in the art will recognize that like parts of the implant 65 labeled with like numerals of the implant 40 incorporate a design and function as previously set forth in the detailed description of the implant 40 according to the second embodiment. The implant 40 includes the anchor 58 in the form of the leg 59 that in the second embodiment is substantially, completely linear, whereas the implant 65 alternative to the second embodiment includes the anchor 58 in the form of the leg 59 whereby the leg 59 is non-linear comprising a first leg segment 66 extending from the bridge 43 at the second end 49 thereof and a second leg segment 67 extending from the first leg segment 66 beneath the bridge 43 at an angle 68. The second leg segment 67 at the tip 60 terminates in feet 69 that assist in anchoring the second leg segment 67 in bone or bones. The leg 59 includes the first leg segment 66 and the second leg segment 67 extending from the first leg segment 66 at the angle 68 when it is desirable to use an implant configured to curve around a bone or bones during capture of a bone fragment or fragments.

When constrained in the insertion shape 41, such as, for example using an implant insertion device, the implant 65 is ready for securing with bone, bones, and/or bone fragments, and, in particular, with a bone and a bone fragment, which are presented herein as an example. A surgeon aligns the bone fragment with the bone at a fusion zone in an orientation that promotes fixation of the bone fragment with the bone and a proper healing thereof. Upon alignment of the bone fragment with the bone at the fusion zone, the surgeon forms a drill hole in the bone configured to receive therein the second leg segment 67 of the leg 59 for the implant 65. The surgeon then inserts the second leg segment 67 into the drill hole formed in the bone such that the first leg segment 66, due to the angle 68 between the first leg segment 66 and the second leg segment 67, resides adjacent the bone in order for the implant 65 to curve around the bone. Concurrent with the insertion of the second leg segment 67 and the locating of the first leg segment 66 adjacent the bone, the surgeon fits the claw 55 and thus the first and second hooks 56 and 57 over the bone fragment and positions the bridge 43 and thus the first and second spans 50 and 51 across the bone and the bone fragment with the transition sections 54 located proximate to the fusion zone. After securing the implant 65 with the bone fragment and the bone across the fusion zone, the surgeon releases the implant 65 resulting in the first and second spans 50 and 51 and thus the bridge 43 attempting to transition from the insertion form 63 to the natural form 61 and the implant 65 attempting to transition from the insertion shape 42 to the natural shape 41 whereby the implant 65 delivers the energy stored therein to the bone fragment and the bone at the fusion zone. In accordance therewith, the anchor 58 in the form of the leg 59 with the first and second leg segments 66 and 67 secures the implant 40 with bone while at the same time the claw 55 in the form of the first and second hooks 56 and 57 fits over and then grasps the bone fragment thereby capturing the bone fragment and holding the bone fragment against the bone such that the implant 65 affixes the bone fragment with the bone through an application of a compressive force to the fusion zone.

The orthopedic fixation system 5 includes an orthopedic implant 70 according to a third embodiment transitionable between a natural shape 71 as illustrated in FIGS. 6A-6D and an insertion shape 72 as illustrated in FIGS. 7A-7D. The implant 70 in the third embodiment may be manufactured from a shape memory material such that the implant 70 transitions between the natural shape 71 and the insertion shape 72. Shape memory materials suitable to implement the implant 70 include elastic biocompatible metals or metal alloys, such as, for example, titanium, stainless steel, and titanium alloy. Shape memory materials suitable to implement the implant 70 preferably include shape memory biocompatible metals or metal alloys with superelastic or temperature dependent properties, such as, for example, Nitinol. The implant 70 when deformed from the natural shape 71 to the insertion shape 72 stores energy deliverable to bone, bones, and/or bone fragments. In accordance with its manufacture from shape memory materials, the implant 70 begins in the natural shape 71, is transitionable to the insertion shape 72, and, once implanted in bone, bones, and/or bone fragments, attempts to transition from the insertion shape 72 to the natural shape 71 whereby the implant 70 delivers the energy stored therein to the bone, bones, and/or bone fragments in order to affix the bone, bones, and/or bone fragments and promote a healing thereof. In the third embodiment, attempted transition of the implant 70 from the insertion shape 72 to the natural shape 71 continuously compresses the bone, bones, and/or bone fragments to promote fusion thereof.

The implant 70 includes a bridge 73 with upper and lower surfaces 74 and 75, first and second sides 76 and 77, and first and second ends 78 and 79. The bridge 73 includes a first span 80 incorporating the first side 76 and a second span 81 incorporating the second side 77 whereby the first span 80 and the second span 81 are spaced apart to define an opening 82 in the bridge 73 between the first span 80 and the second span 81. The first span 80 and the second span 81 in the third embodiment are connected at the first end 78 and at the second end 79, and, more particularly, the first span 80 and the second span 81 converge and integrate at the first end 78 and at the second end 79. The implant 70 in the bridge 73 includes a transition section and more particularly in the third embodiment a transition section 83 located in the first span 80, whereas the bridge 73 includes a slot 84 located in the second span 81 that divides the second span 81 into a first span segment 85 at the first end 78 and a second span segment 86 at the second end 79. The transition section 83 in the first span 80 in combination with the inclusion of the slot 84 in the second span 81 facilitates transition of the implant 70 between the natural shape 71 and the insertion shape 72. The implant 70 includes a claw 87 extending from the bridge 73 at the first end 78 thereof configured to capture bone, bones, or bone fragments. The claw 87 in the third embodiment includes at least a first hook 88, which may be located centrally relative to the first end 78, and preferably a first hook 88 extending from the first end 78 at the first side 76 and a second hook 89 extending from the first end 78 at the second side 77. The implant 70 includes an anchor 90 extending from the bridge 73 at the second end 79 thereof configured to secure the implant 70 with bone or bones. The anchor 90 in the third embodiment preferably includes a leg 91 located centrally relative to the second end 79. Nevertheless, the anchor 90 may include the leg 91 extending from the second end 79 at the first side 76 and a second leg extending from the second end 79 at the second side 77. The leg 91 has a tip 92 and may include barbs thereon that improve the pull-out resistance of the implant 70. The anchor 90 in the form of the leg 91 secures the implant 70 with bone or bones while the bridge 73 extends over the bone or bones in order to position the claw 87 in the form of the first and second hooks 88 and 89 at a bone fragment or bone fragments such that the claw 87 captures the bone fragment or bone fragments. The implant 70, after capturing the bone fragment or bone fragments and an attempted transition thereof from the insertion shape 72 to the natural shape 71, delivers the energy stored therein to the bone fragment or bone fragments thereby affixing the bone fragment or bone fragments with the bone or bones.

The regular inherent shape of the implant 70, as illustrated in FIGS. 6A-6D, is the natural shape 71 where the transition section 83, in accordance with the inclusion of the slot 84 in the second span 81 of the bridge 73, locates respectively the first and second spans 80 and 81 and thus the bridge 73 in a natural form 93 consisting of a closed profile whereby the claw 87 and the anchor 90 reside at a first distance 94. In particular, the first span 80 at the transition section 83 thereof pivots such that the first span segment 85 and the second span segment 86 of the second span 81, due to the slot 84, progress to a closed position, which, in the third embodiment, consists of the first span segment 85 abutting the second span segment 86. Nevertheless, as illustrated in FIGS. 7A-7D, the implant 70 is deformable, preferably under the action of superelasticity or temperature dependent shape memory, from the natural shape 71 to the insertion shape 72 where the transition section 83, in accordance with the inclusion of the slot 84 in second span 81 of the bridge 73, deforms to store energy while also moving respectively the first and second spans 80 and 81 and thus the bridge 73 from the natural form 93 to an insertion form 95 consisting of an open profile whereby the claw 87 and the anchor 90 reside at a second distance 96 that is greater than the first distance 94. In particular, the first span 80 at the transition section 83 thereof pivots such that the first span segment 85 and the second span segment 86 of the second span 81, due to the slot 84, progress to an open position, which, in the third embodiment, consists of the first span segment 85 separating from the second span segment 86. Since the insertion shape 72 is not the regular inherent shape of the implant 70, the bridge 73 typically is mechanically constrained using an implant insertion device whereby the implant insertion device maintains the bridge 73 and thus the first and second spans 80 and 81 in the insertion form 95. Illustratively, an implant insertion device, an example of which will be described in greater detail herein, couples with the implant 70 at the bridge 73 thereof such that the implant insertion device holds the bridge 73 and thus the first and second spans 80 and 81 in the insertion form 95, resulting in the implant insertion device constraining the deformed transition section 83 in order to maintain the implant 70 in the insertion shape 72. After implantation into bone or bones including a capture of a bone fragment or fragments and a release of the implant insertion device, the implant 70 delivers the energy stored in the transition section 83 whereby the first and second spans 80 and 81 and thus the bridge 73 attempt to transition from the insertion form 95 to the natural form 93 such that the implant 70, which attempts transition from the insertion shape 72 to the natural shape 71, affixes the bone fragment or fragments with the bone or bones through an application of a compressive force thereto.

When constrained in the insertion shape 71, such as, for example using an implant insertion device, the implant 70 is ready for securing with bone, bones, and/or bone fragments, and, in particular, with a bone and a bone fragment, which are presented herein as an example. A surgeon aligns the bone fragment with the bone at a fusion zone in an orientation that promotes fixation of the bone fragment with the bone and a proper healing thereof. Upon alignment of the bone fragment with the bone at the fusion zone, the surgeon forms a drill hole in the bone configured to receive therein the leg 91 of the implant 70. The surgeon then inserts the leg 91 into the drill hole formed in the bone. Concurrent with the insertion of the leg 91, the surgeon fits the claw 87 and thus the first and second hooks 88 and 89 over the bone fragment and positions the bridge 73 and thus the first and second spans 80 and 81 across the bone and the bone fragment with the transition section 83 located proximate to the fusion zone. After securing the implant 70 with the bone fragment and the bone across the fusion zone, the surgeon releases the implant 70 resulting in the first and second spans 80 and 81 and thus the bridge 73 attempting to transition from the insertion form 95 to the natural form 93 and the implant 70 attempting to transition from the insertion shape 72 to the natural shape 71 whereby the implant 70 delivers the energy stored therein to the bone fragment and the bone at the fusion zone. More particularly, the first span 80 at the transition section 83 thereof attempts to pivot such that the first span segment 85 and the second span segment 86 of the second span 81, due to the slot 84, attempt to progress from their open position to their closed position. In accordance therewith, the anchor 90 in the form of the leg 91 secures the implant 70 with bone while at the same time the claw 87 in the form of the first and second hooks 88 and 89 fits over and then grasps the bone fragment thereby capturing the bone fragment and holding the bone fragment against the bone such that the implant 70 affixes the bone fragment with the bone through an application of a compressive force to the fusion zone.

FIGS. 8A-8E illustrate an implant delivery device 100 of the orthopedic fixation system 5 configured to facilitate a securing of one of the implants 10, 40, 65, and 70 with bone, bones, and/or bone fragments, and, in particular, with a bone and a bone fragment which will be presented more fully herein as an example. The implant delivery device 100, which extends from a proximal end 101 to a distal end 102, terminates in an implant grip 103 located at the distal end 102. The implant delivery device 100 in a preferred embodiment includes a handle 104 with a shaft 105 extending therefrom that terminates in the implant grip 103.

The implant grip 103, which defines a cavity 106 having an entrance 107, includes a first retention tab 108 extending into the cavity 106 at the entrance 107 and a second retention tab 109 extending into the cavity 106 at the entrance 107 in opposed relationship to the first retention tab 108. The implant grip 103 in order to define the cavity 106 includes first and second side walls 110 and 111 and first and second end walls 112 and 113. In the preferred embodiment, the first retention tab 108 extends into the cavity 106 from the first side wall 110, whereas the second retention tab 109 extends into the cavity 106 from the second side wall 111.

The implant grip 103 as defined by the first and second side walls 110 and 111 and the first and second end walls 112 and 113 is sized to receive therein one of the implants 10, 40, 65, and 70 at a respective bridge 13, 43, and 73 thereof when the implants 10, 40, 65, and 70 reside in a respective insertion shape 12, 42, and 72. More particularly, the implant grip 103 includes a length measured between the first and second end walls 112 and 113 that allows the implants 10, 40, 65, and 70 when in a respective insertion shape 12, 42, and 72 to fit within the implant grip 103 along a length thereof as measured from a respective claw 24, 55, and 87 to a respective anchor 27, 58, and 90. The implant grip 103 further includes a width measured between the first and second side walls 110 and 111 that allows the implants 10, 40, 65, and 70 when in a respective insertion shape 12, 42, and 72 to fit within the implant grip 103 along a width thereof as measured from a respective first side 16, 46, and 76 to a respective second side 17, 47, and 75. Moreover, the cavity 106 as defined by the implant grip 103 and in particular the first and second side walls 110 and 111 and the first and second end walls 112 and 113 includes a depth that allows the implants 10, 40, 65, and 70 when in a respective insertion shape 12, 42, and 72 to fit within the implant grip 103 along a thickness thereof as measured from a respective upper surface 14, 44, and 74 to a respective lower surface 15, 45, 75 such that the implants 10, 40, 65, and 70 at a respective bridge 13, 43, and 73 thereof fits within the implant grip 103 while a respective claw 24, 55, and 87 at the first end wall 112 and a respective anchor 27, 58, and 90 at the second end wall 113 extend from the implant grip 103.

The implant insertion device 100 may be manufactured from any suitable material, such as for example a plastics material, and, more particularly, with respect to the implant grip 103 at the first and second retention tabs 108 and 109, from a suitable resilient material, such as for example a resilient plastics material. The first retention tab 108 and the second retention tab 109 of the implant grip 103 in the preferred embodiment of the implant insertion device 100 are resilient in order to permit the implant grip 103 to receive therein one of the implants 10, 40, 65, and 70 at a respective bridge 13, 43, and 73 thereof when the implants 10, 40, 65, and 70 reside in a respective insertion shape 12, 42, and 72. During insertion of one of the implants 10, 40, 65, and 70 at a respective bridge 13, 43, and 73 thereof into the implant grip 103, the first retention tab 108 and the second retention tab 109 initially contact one of the implants 10, 40, 65, and 70 at a respective upper surface 14, 44, and 74. As one of the implants 10, 40, 65, and 70 inserts into the cavity 106 of the implant grip 103, a respective bridge 13, 43, and 73 at a respective upper surface 14, 44, and 74, due to the first and second retention tabs 108 and 109 being resilient, pushes the first and second retention tabs 108 and 109 away from the entrance 107 and into the cavity 106 until one of the implants 10, 40, 65, and 70 at a respective bridge 13, 43, and 73 by-passes the first and second retention tabs 108 and 109 and enters the cavity 106. Once one of the implants 10, 40, 65, and 70 at a respective bridge 13, 43, and 73 by-passes the first and second retention tabs 108 and 109, the first and second retention tabs 108 and 109 on the basis of their resilient design return to the entrance 107 of the cavity 106 under one of the implants 10, 40, 65, and 70 at a respective lower surface 15, 45, and 75. In accordance with the first and second retention tabs 108 and 109 supporting one of the implants 10, 40, 65, and 70 at a respective lower surface 15, 45, and 75, the implant grip 103 and thus the implant insertion device 100 constrains one of the implants 10, 40, 65, and 70 in a respective insertion shape 12, 42, and 72 while a respective claw 24, 55, and 87 at the first end wall 112 and a respective anchor 27, 58, and 90 at the second end wall 113 extend from the implant grip 103.

During formation of the orthopedic fixation system 5 through a securing of the implant insertion device 100 at the implant grip 103 thereof with the implant 10 as illustrated in FIGS. 8A-8E, which is presented herein as an example, the implant 10 is mechanically deformed from the natural shape 11 to the insertion shape 12 such that the implant 10 stores mechanical energy. Mechanical deformation of the implant 10 may include cooling of the implant 10 whereby the implant 10 transitions from its austenite phase to its martensite phase in order to facilitate an easier mechanical deformation of the implant 10 from the natural shape 11 to the insertion shape 12 prior to a loading of the implant insertion device 100 with the implant 10. Upon mechanical deformation of the implant 10 whereby the transition sections 23 located in the first and second spans 20 and 21 deform to store energy while also moving the bridge 13 from the natural form 32 where the claw 24 and the anchor 27 reside at the first distance 33 to the insertion form 34 where the claw 24 and the anchor 27 reside at the second distance 35, the implant insertion device 100 at the implant grip 103 seats atop the implant 10 at the upper surface 14 of the bridge 13 such that the first retention tab 108 contacts the first span 20 of the bridge 13 at the upper surface 14 and the second retention tab 109 contacts the second span 21 of the bridge 13 at the upper surface 14. After seating atop the implant 10 at the upper surface 14 of the bridge 13, a pressing of the implant grip 103 against the upper surface 14 of the bridge 13 results in the bridge 13 and more particularly the first and second spans 20 and 21, due to the first and second retention tabs 108 and 109 being resilient, respectively pushing the first and second retention tabs 108 and 109 away from the entrance 107 and into the cavity 106 respectively toward the first and second side walls 110 and 111. The pressing of the implant grip 103 continues until the bridge 13 and more particularly the first and second spans 20 and 21 respectively by-pass the first and second retention tabs 108 and 109, whereupon the implant 10 at the bridge 13 enters the cavity 106. Once the bridge 13 and more particularly the first and second spans 20 and 21 respectively by-pass the first and second retention tabs 108 and 109, the first and second retention tabs 108 and 109 on the basis of their resilient design return to the entrance 107 of the cavity 106 under the bridge 13 at the lower surface 15. In accordance with the first and second retention tabs 108 and 109 supporting the bridge 13 at the lower surface 15 and more particularly the first and second spans 20 and 21 respectively, the implant grip 103 and thus the implant insertion device 100 constrains the implant 10 in the insertion shape 12 while the claw 24 at the first end wall 112 and the anchor 27 at the second end wall 113 extend from the implant grip 103. Although a loading of the implant insertion device 100 at the implant grip 103 thereof has been described with respect to the implant 10, one of ordinary skill in the art will recognize the implant insertion device 100 may be loaded with any of the implants 10, 40, 65, and 70 on the basis the first and second retention tabs 108 and 109 engage and support the respective bridges 13, 43, and 73 of the implants 10, 40, 65, and 70 at respective first sides 16, 46, and 76 and second sides 17, 47, and 77 thereof such that the implants 10, 40, 65, and 70 fit within the implant grip 103 regardless of the shape of the bridges 13, 43, and 73, the claws 24, 55, and 87, and or anchors 27, 58, and 90.

Figure 9A:
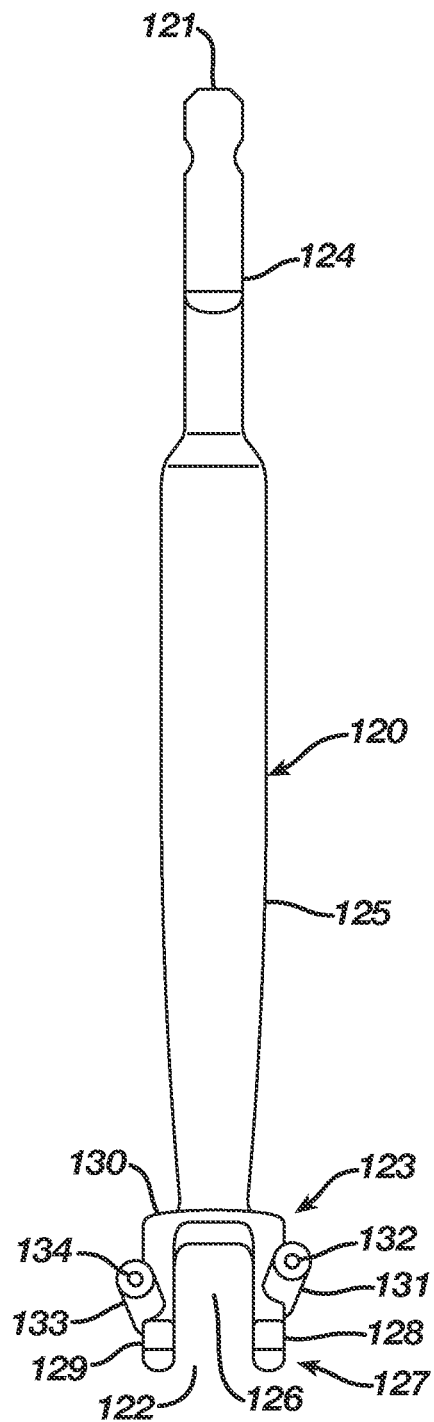
FIG. 9A is a front view illustrating a bone holding device used during insertion of an orthopedic implant according to the first embodiment.
Figure 9B:
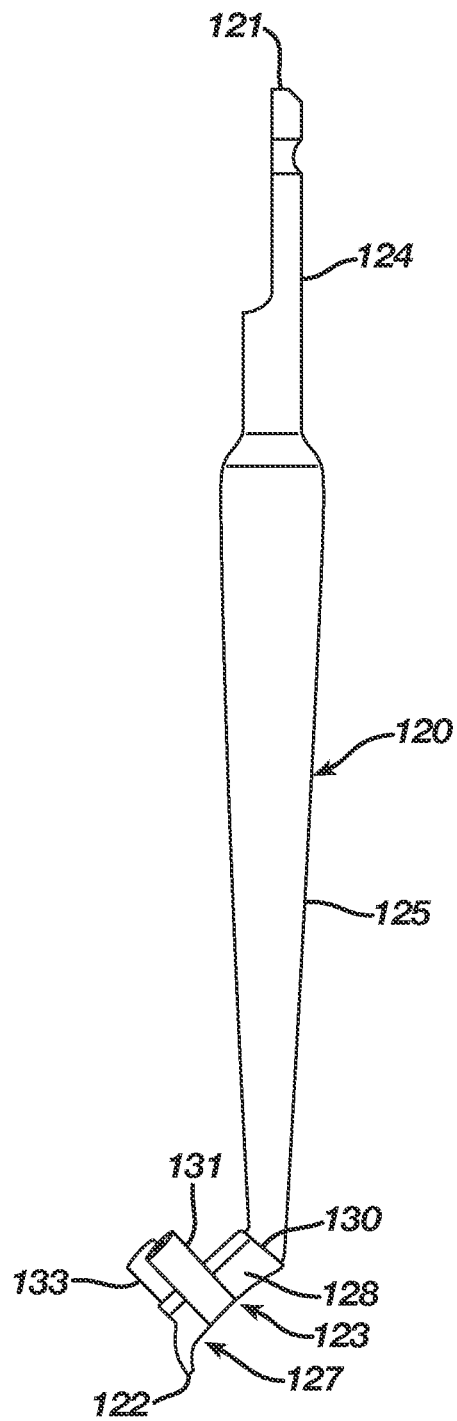
FIG. 9B is a side view illustrating the bone holding device used during insertion of the orthopedic implant according to the first embodiment.

FIGS. 9A-9B illustrate a bone holding device 120 of the orthopedic fixation system 5 configured to facilitate a holding of bone, bones, and/or bone fragments during a securing of one of the implants 10, 40, 65, and 70 with the bone, bones, and/or bone fragments, and, in particular, with a bone and a bone fragment which will be presented more fully herein as an example. The bone holding device 120, which extends from a proximal end 121 to a distal end 122, terminates in a bone grip 123 located at the distal end 122. The bone holding device 120 in a preferred embodiment includes a tang 124 configured to integrate the bone holding device 120 with a handle and a shank 125 extending from the tang 124 that terminates in the bone grip 123.

The bone grip 123, which defines a slot 126 suitable to receive instrumentation therein, is configured to capture bone, bones, and/or bone fragments. The bone grip 123 in the preferred embodiment comprises a claw 127 extending from the shank 125 configured to capture bone, bones, and/or bone fragments. The claw 127 includes a first hook 128 and a second hook 129 extending from opposite ends of a crosspiece 130 connected with the shank 125. The first hook 128 and the second hook 129 define the slot 126 therebetween. The bone grip 123 includes a first boss 131 with a passage 132 configured to receive therethrough a securing pin such as a K-wire spaced apart across the slot 126 from a second boss 133 with passage 134 configured to receive therethrough a securing pin such as a K-wire. The first boss 131 and the second boss 133 in the preferred embodiment connect with the claw 127 across the slot 126. More particularly, the first boss 131 connects with the first hook 128 and the second boss 133 connects with the second hook 129 whereby the first and second bosses 131 and 133 are spaced apart across the slot 126.

The bone grip 123 is configured to seat atop bone, bones, and/or bone fragments while further holding the bone, bones, and/or bone fragments in order to facilitate a securing of one of the implants 10, 40, 65, and 70 with the bone, bones, and/or bone fragments. By way of example with respect to a bone and a bone fragment, a surgeon aligns the bone fragment with the bone at a fusion zone in an orientation that promotes fixation of the bone fragment with the bone and a proper healing thereof. Upon alignment of the bone fragment with the bone at the fusion zone, the surgeon using a handle coupled with the bone holding device 120 at the tang 124 thereof seats the bone grip 123 atop the bone and the bone fragment such that the bone grip 123 fits over and then grasps the bone fragment thereby capturing the bone fragment and holding the bone fragment against the bone. The surgeon then inserts a first securing pin through the passage 132 of the first boss 131 and into one of the bone and the bone fragment and a second securing pin through the passage 134 of the second boss 133 and into one of the bone and the bone fragment whereby the bone grip 123 holds the bone fragment against the bone while the slot 126 provides access to the bone and the bone fragment. More particularly, the claw 127 at the crosspiece 130 seats atop the bone while the first hook 128 and the second hook 129 extend across the bone to fit over and then grasp the bone fragment thereby capturing the bone fragment and holding the bone fragment against the bone. After locating the claw 127, the surgeon inserts a first securing pin through the passage 132 of the first boss 131 and into the bone fragment and a second securing pin through the passage 134 of the second boss 133 and into the bone whereby the claw 127 holds the bone fragment against the bone while the slot 126 provides access to the bone and the bone fragment. With the bone fragment held against the bone, the surgeon can proceed with the securing of one of the implants 10, 40, 65, and 70 with the bone and the bone fragment.

Figure 10A:
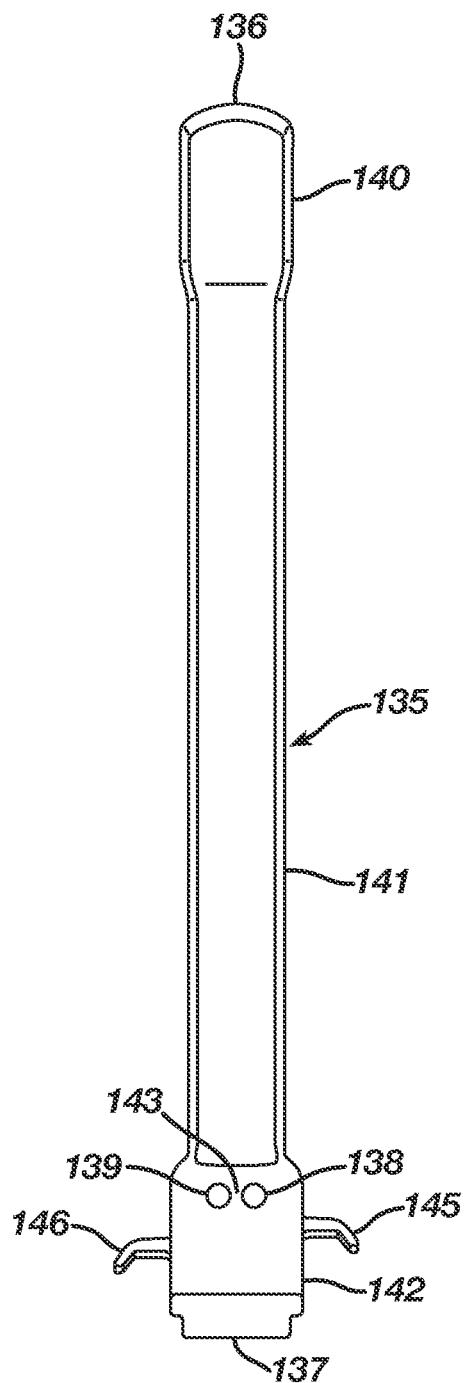
FIG. 10A is a front view illustrating a drill guide used during insertion of an orthopedic implant according to the first embodiment.
Figure 10B:
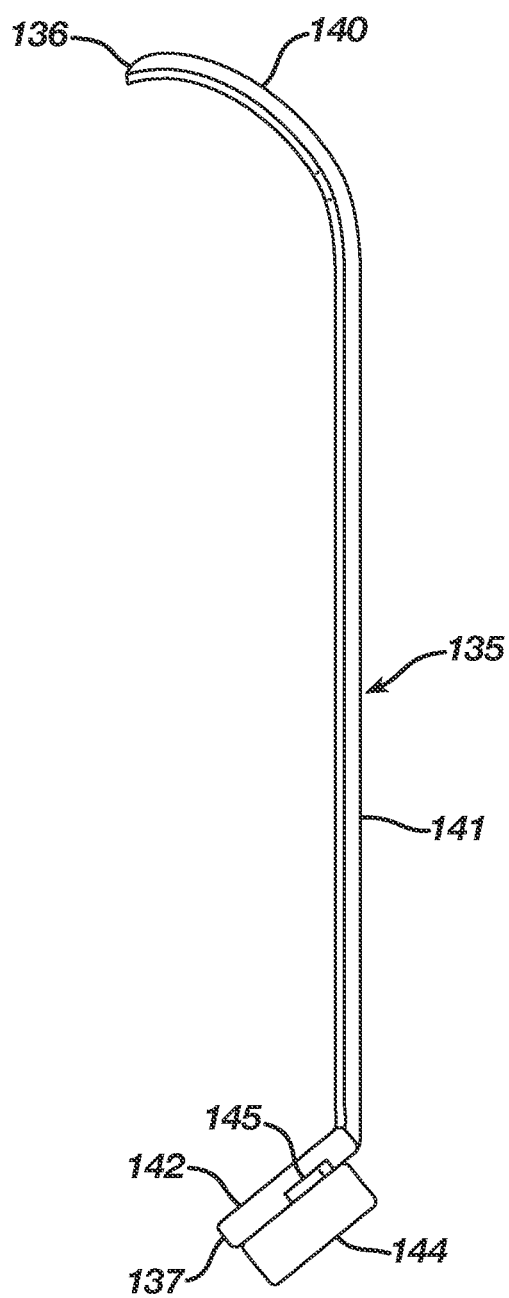
FIG. 10B is a side view illustrating the drill guide used during insertion of the orthopedic implant according to the first embodiment.
Figure 11A:
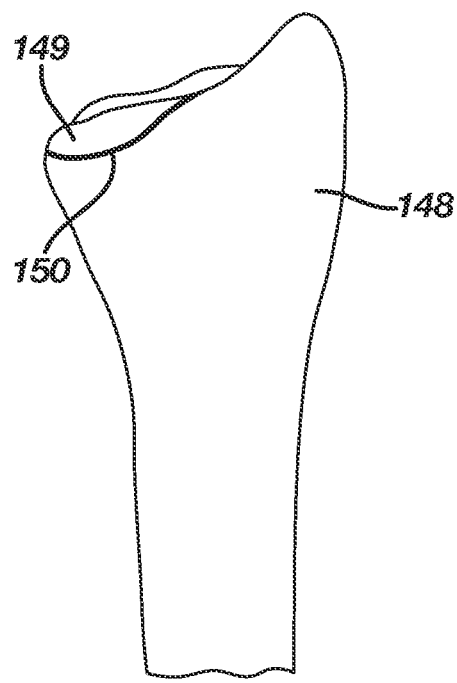
FIG. 11A is a top view illustrating a bone with a fracture exhibiting complex characteristics.
Figure 11B:
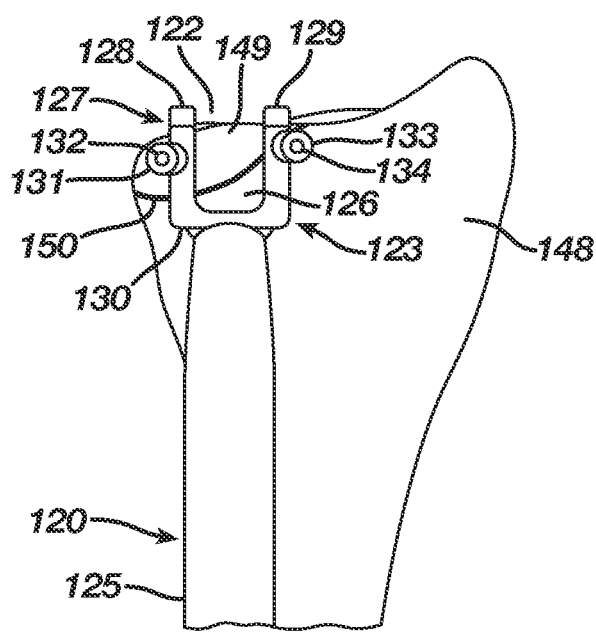
FIGS. 11B, 11D, and 11E are top views illustrating the bone holding device holding the bone at the fracture thereof.
Figure 11C:
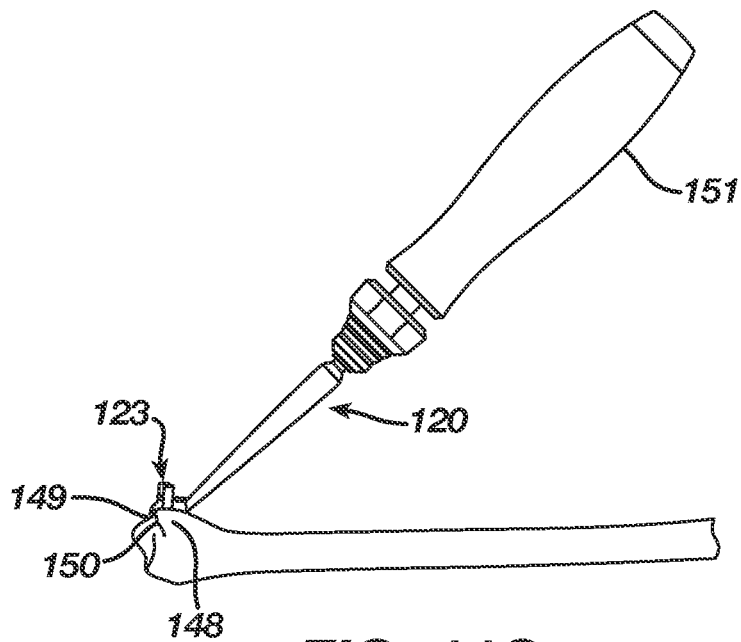
FIGS. 11C and 11F are side views illustrating the bone holding device holding the bone at the fracture thereof.
Figure 11D:
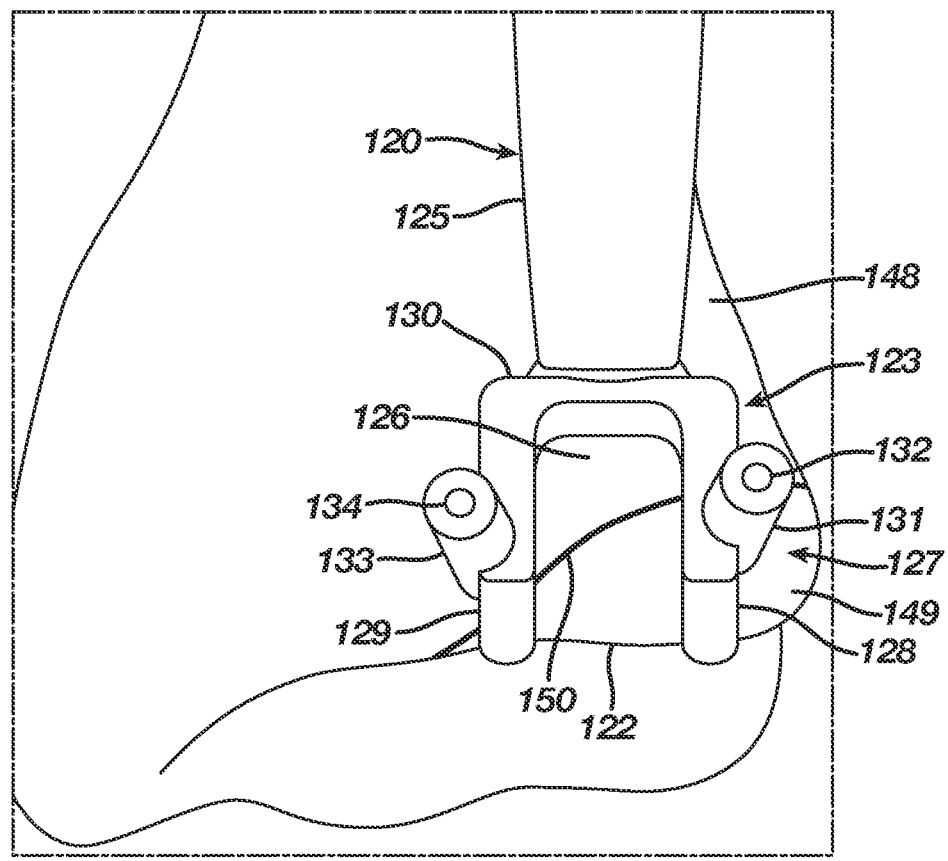
Figure 11E:
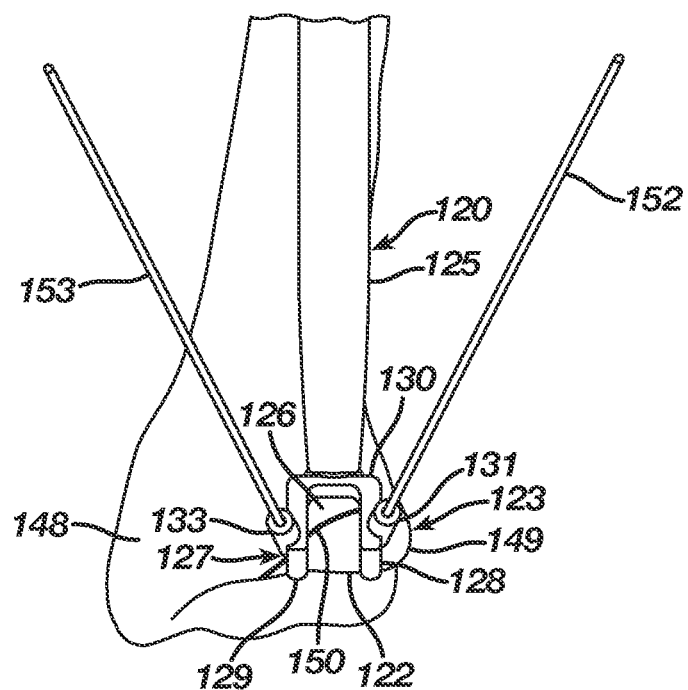
Figure 11F:
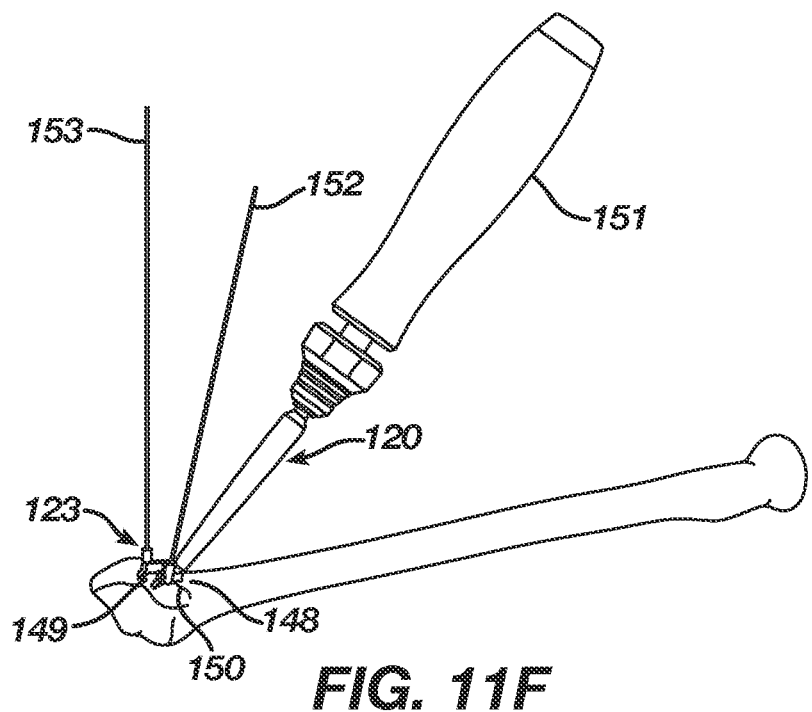
Figure 11G:
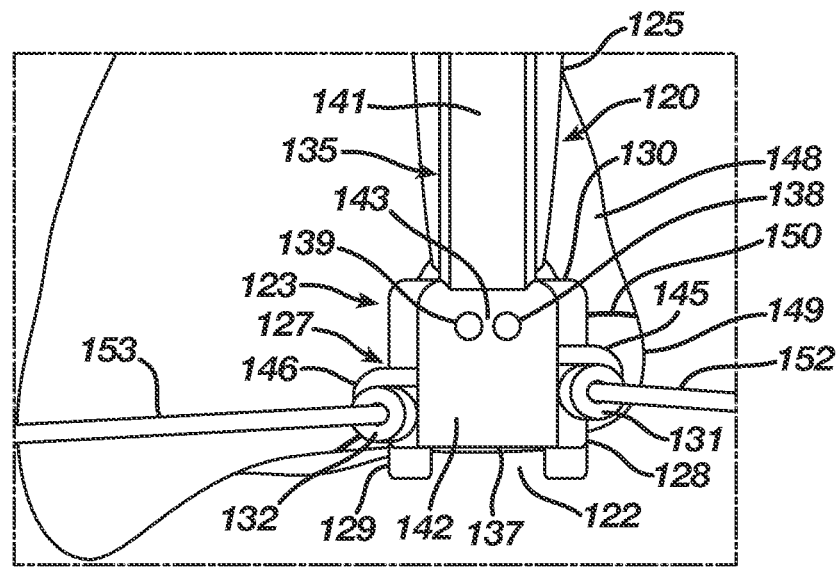
FIG. 11G is a top view illustrating use of the drill guide in a drilling of holes in the bone adjacent the fracture thereof.
Figure 11H:
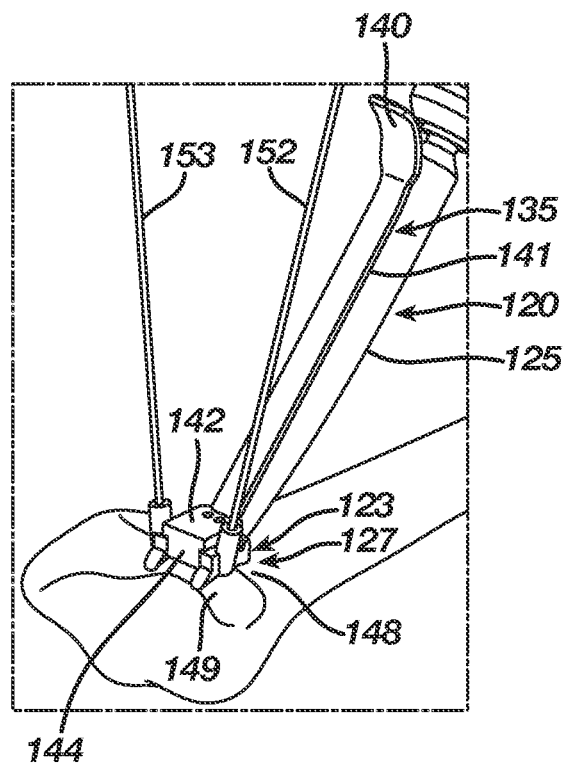
FIG. 11H is a perspective view illustrating use of the drill guide in a drilling of holes in the bone adjacent the fracture thereof.
Figure 11I:
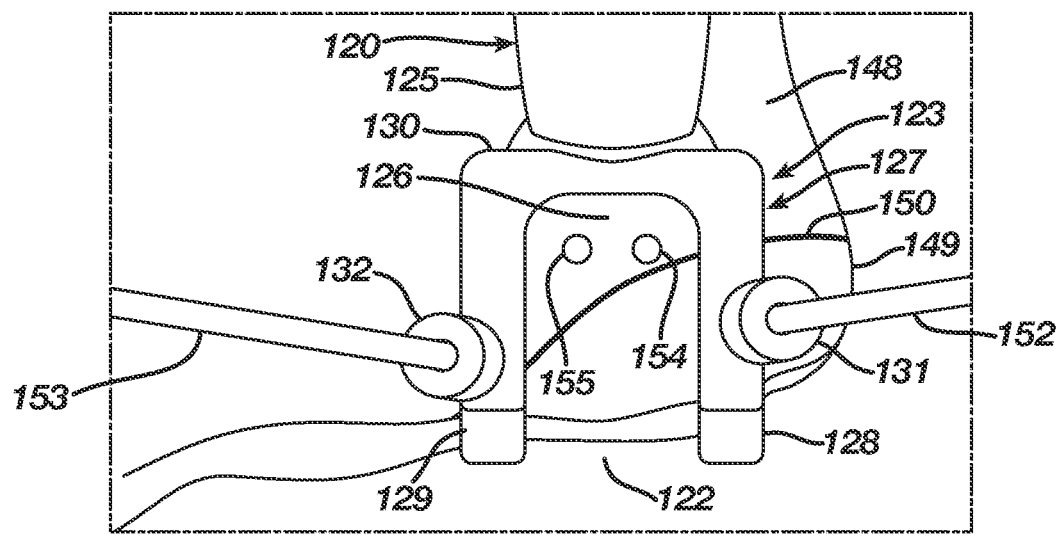
FIG. 11I is a top view illustrating the bone including drill holes formed therein adjacent the fracture thereof.
Figure 11J:
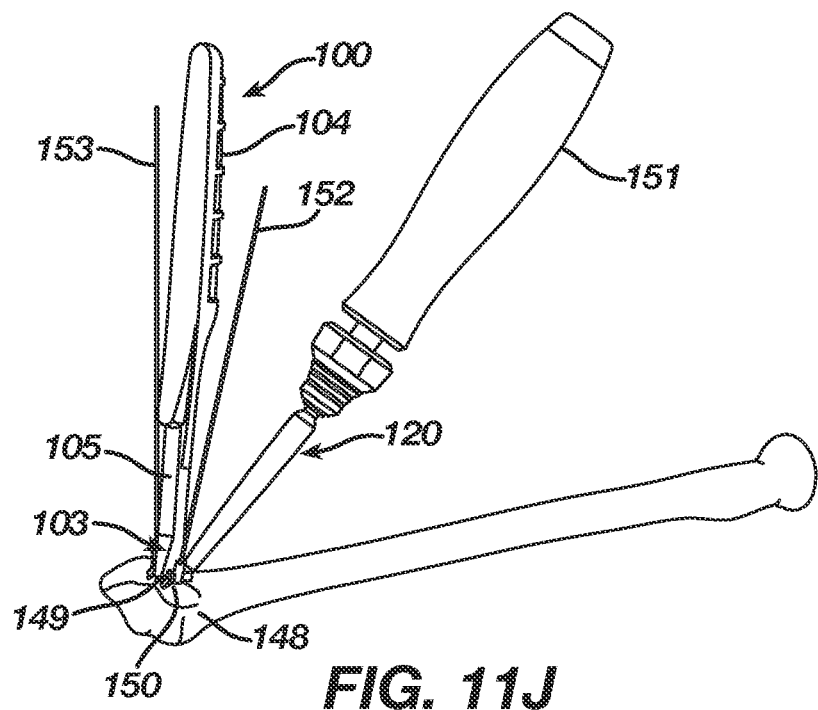
FIG. 11J is a perspective view illustrating use of the implant insertion device in delivering an orthopedic implant according to the first embodiment to the bone such that the orthopedic implant captures the fracture.
Figure 11K:
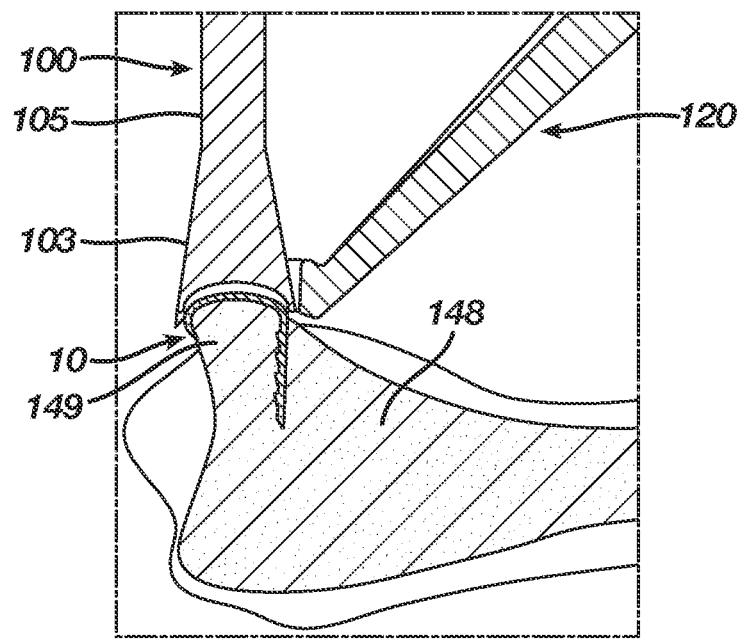
FIG. 11K is a side view in cross-section illustrating use of the implant insertion device in delivering the orthopedic implant according to the first embodiment to the bone such that the orthopedic implant captures the fracture.
Figure 11L:
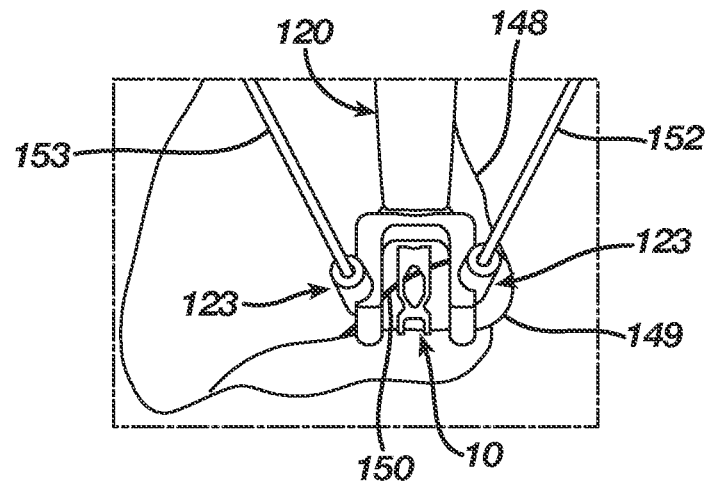
FIG. 11L is a top view illustrating the orthopedic implant according to the first embodiment inserted in the bone while capturing the fracture thereof upon removal of the orthopedic implant from the implant insertion device.
Figure 11M:
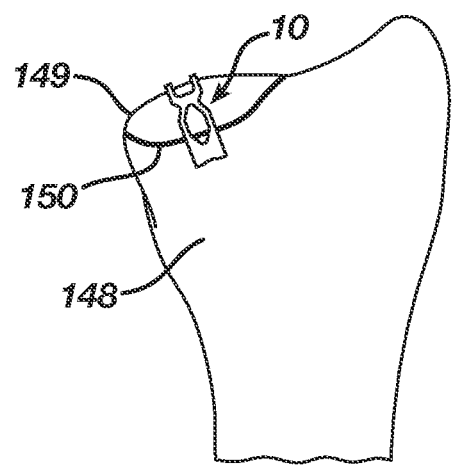
FIG. 11M is a top view illustrating the orthopedic implant according to the first embodiment inserted in the bone while capturing the fracture thereof upon removal of the bone holding device.

FIGS. 10A-10B illustrate a drill guide 135 of the orthopedic fixation system 5 configured to facilitate a drilling of a hole or holes in bone, bones, and/or bone fragments during a securing of one of the implants 10, 40, 65, and 70 with the bone, bones, and/or bone fragments, and, in particular, with a bone and a bone fragment which will be presented more fully herein as an example. The drill guide 135, which extends from a proximal end 136 to a distal end 137, defines at the distal end 137 at least a first guide hole 138 when the drill guide 135 is used with one of the implants 40, 65, and 70 and a first guide hole 138 and a second guide hole 139 when the drill guide 135 is used with the implant 10. The drill guide 135 in a preferred embodiment includes a handle 140, a shank 141 extending from the handle 140, and a template 142 extending from the shank 141 that defines the first guide hole 138 or the first and second guide holes 138 and 139. The first guide hole 138 or the first and second guide holes 138 and 139 in the preferred embodiment are positioned in the template 142 adjacent the handle 140 in order to locate a drill hole or drill holes in a bone such that a respective leg 59 or 91 or a respective first and second legs 28 and 29 of one of the implants 10, 40, 65, and 70 implants in the bone while a respective claw 24, 55, and 87 grasps a bone fragment. The first guide hole 138 for a drill guide 135 used with one of the implants 40, 65, and 70 is positioned in the template 142 along a center line of the drill guide 135, whereas the first and second guide holes 138 and 139 for a drill guide 135 used with the implant 10 are positioned in the template 142 at a distance 143 equal to the distance 36 between the first leg 28 and the second leg 29 when the implant 10 resides in the insertion shape 12. The drill guide 135 at the template 142 is configured to fit into the slot 126 of the bone grip 123 whereby the bone grip 123 aligns the template 142 and thus the first guide hole 138 or the first and second guide holes 138 and 139 over a bone requiring a drilling of a hole or holes therein. The template 142 includes a base 144 that inserts within the slot 126 between the first and second hooks 128 and 129 while abutting at least the crosspiece 130 in order to locate the template 142 for a drilling of a hole or holes. The template 142 includes first and second tabs 145 and 146 extending therefrom configured respectively to contact the first boss 131 and the second boss 133 such that the first and second tabs 145 and 146 assist in aligning the template 142 for a drilling of a hole or holes.

In accordance with the orthopedic fixation system 5, the implant insertion device 100 at the implant grip 103 thereof, when loaded with the implant 10 as previously described, retains the implant 10 in its insertion shape 12 such that the implant 10 is ready for securing with bone, bones, or bone pieces, and, in particular, with a bone 148 and a bone fragment 149 as illustrated in FIGS. 11A-11M, which are presented herein as an example. A surgeon aligns the bone fragment 149 with the bone 148 at a fusion zone 150 in an orientation that promotes fixation of the bone fragment 149 with the bone 148 and a proper healing thereof. Upon securing a handle 151 with the bone holding device 120 at the tang 124 thereof, the surgeon using the handle 151 seats the bone grip 123 atop the bone 148 and the bone fragment 149 such that the bone grip 123 fits over and then grasps the bone fragment 149 thereby capturing the bone fragment 149 and holding the bone fragment 149 against the bone 148. More particularly, the claw 127 at the crosspiece 130 seats atop the bone 148 while the first hook 128 and the second hook 129 extend across the bone 148 to fit over and then grasp the bone fragment 149 thereby capturing the bone fragment 149 and holding the bone fragment 149 against the bone 148. After locating the claw 127, the surgeon inserts a first securing pin 152, such as a K-wire, through the passage 132 of the first boss 131 and into the bone fragment 149 and a second securing pin 153, such as a K-wire, through the passage 134 of the second boss 133 and into the bone 148 whereby the claw 127 holds the bone fragment 149 against the bone 148 while the slot 126 of the bone holding device 120 provides access to the bone 148 and the bone fragment 149. The claw 127 in the preferred embodiment is sized whereby the first hook 128 and the second hook 129 when grasping the bone fragment 149 locate the crosspiece 130 at the bone 148 such that the slot 126 adjacent the crosspiece 130 resides over the bone 148 to provide access thereto.

With the bone fragment 149 held against the bone 148 at the fusion zone 150, the surgeon is ready to drill first and second drill holes 154 and 155 in the bone 148 using the drill guide 135. The surgeon using the handle 140 inserts the template 142 at the base 144 into the slot 126 between the first and second hooks 128 and 129 until the template 142 at the base 144 abuts the crosspiece 130 and the first and second tabs 145 and 146 respectively to contact the first boss 131 and the second boss 133. This insertion of the template 142 into the slot 126 positions the first and second guide holes 138 and 139 over the bone 148 in order to locate the first and second drill holes 154 and 155 in the bone 148 such that the first and second legs 28 and 29 of the implant 10 implant in the bone 148 while the bridge 13 of the implant 10 extends over the bone 148 and the bone fragment 149 thereby positioning the claw 24 of the implant 10 at the bone fragment 149. The surgeon then inserts a drill bit through the first guide hole 138 and drills the first drill hole 154 in the bone 148. Likewise, the surgeon inserts the drill bit through the second guide hole 139 and drills the second drill hole 155 in the bone 148. After drilling the first and second drill holes 154 and 155 in the bone 148, the surgeon using the handle 140 removes the template 142 from the slot 126 and the drill guide 135 from the bone holding device 120.

Upon the drilling of the first and second drill holes 154 and 155 in the bone 148 with the bone fragment 149 remaining held against the bone 148 at the fusion zone 150, the surgeon can proceed with the securing of the implant 10 with the bone 148 and the bone fragment 149. The surgeon using the handle 104 of the implant delivery device 100 positions the implant 10 within the slot 126 of the bone grip 123 with the tip 30 of the first leg 28 adjacent the first drill hole 154 and the tip 31 of the second leg 29 adjacent the second drill hole 155. After the tips 30 and 31 reside respectively at the first and second drill holes 154 and 155, the surgeon inserts the first and second legs 28 and 29 respectively into the first and second drill holes 154 and 155 until the implant grip 103 fits the claw 24 and thus the first and second hooks 25 and 26 of the implant 10 over the bone fragment 149 while positioning the bridge 13 and thus the first and second spans 20 and 21 across the bone 148 and the bone fragment 149 with the transition sections 23 located proximate to the fusion zone 150. Although an insertion of the implant 10 typically includes pre-drilling of the first and second drill holes 154 and 155, the surgeon using the implant delivery device 100 may impact the first and second legs 28 and 29 respectively into the bone 148 at a desired location.

After inserting the first and second legs 28 and 29 respectively into the first and second drill holes 154 and 155 whereby the bridge 13 spans the bone 148 and the bone fragment 149 and the claw 24 at the first and second hooks 25 and 26 fits over the bone fragment 149, the surgeon separates the implant delivery device 100 at the implant grip 103 from the implant 10. While holding the handle 151 to prevent movement of the bone 148 and the bone fragment 149, the surgeon using the handle 104 pulls on the implant delivery device 100 such that the implant grip 103 contacts the bridge 13 at the lower surface 15 and more particularly the first and second retention tabs 108 and 109 of the implant grip 103 respectively contact the first and second spans 20 and 21 of the bridge 13. As the surgeon continues to pull on the handle 104 of the implant delivery device 100, the first and second spans 20 and 21 of the bridge 13, due to the resilience of the first and second retention tabs 108 and 109, respectively push the first and second retention tabs 108 and 109 out of the cavity 106 and away from the entrance 107 until the first and second retention tabs 108 and 109 respectively by-pass the first and second spans 20 and 21, whereupon the implant grip 103 releases the implant 10 therefrom. Once the first and second retention tabs 108 and 109 respectively by-pass the bridge 13 and more particularly the first and second spans 20 and 21, the first and second retention tabs 108 and 109 on the basis of their resilient design return to the entrance 107 of the cavity 106.

With the release of the implant 10 from the implant grip 103, the surgeon tamps the implant 10 in order to seat the implant 10 at the bridge 13 atop the bone 148 and the bone fragment 149 with the claw 24 in the form of the first and second hooks 25 and 26 fit over and grasping the bone fragment 149. The surgeon then pulls the first and second securing pins 152 and 153 respectively from the first and second bosses 131 and 132 thereby releasing the bone holding device 120, which is removed from the bone 148 and the bone fragment 149. After securing the implant 10 with the bone 148 and the bone fragment 149 across the fusion zone 150, the implant 10 attempts to transition from the insertion shape 12 to the natural shape 11 and more particularly the first and second spans 20 and 21 and thus the bridge 13 attempt to transition from the insertion form 34 to the natural form 32 whereby the implant 10 delivers the energy stored therein to the bone fragment 149 and the bone 148 at the fusion zone 150. In accordance therewith, the anchor 27 in the form of the first and second legs 28 and 29 secures the implant 10 with bone 148 while at the same time the claw 24 in the form of the first and second hooks 25 and 26 fits over and then grasps the bone fragment 149 thereby capturing the bone fragment 149 and holding the bone fragment 149 against the bone 148 such that the implant 10 affixes the bone fragment 149 with the bone 148 through an application of a compressive force to the fusion zone 150. Although the foregoing describes use of the implant 10, one of ordinary skill in the art will recognize use of the implants 40, 65, and 70 would be similar except that the single anchors 58 and 90 require only a single drill hole.

Figure 12:
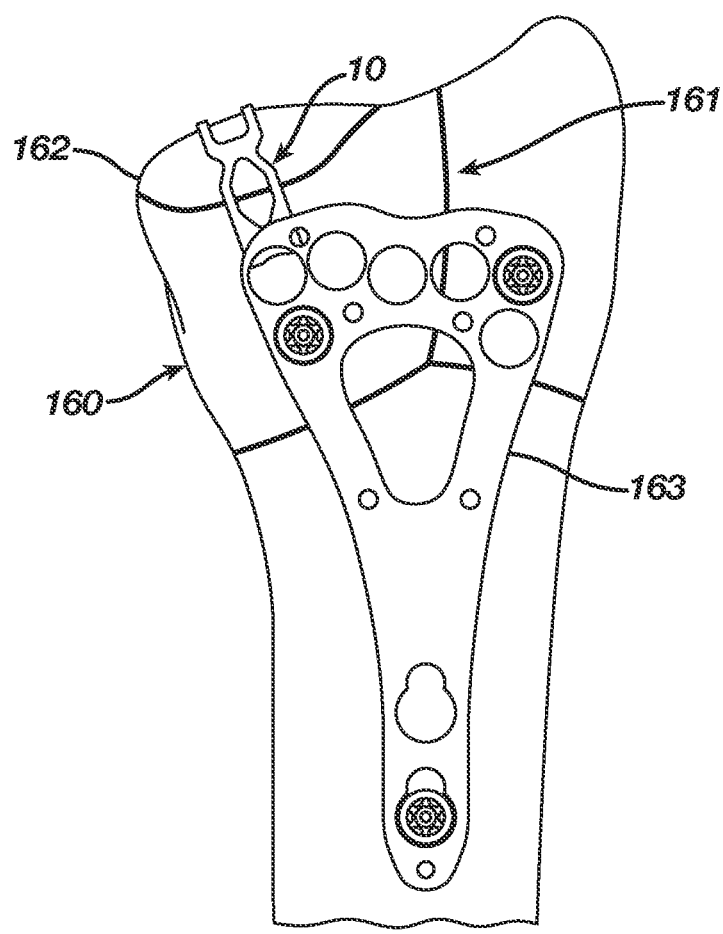
FIG. 12 is a top view illustrating an orthopedic implant according to the first embodiment used in combination with a plate to fixate a bone with fractures exhibiting complex characteristics.

FIG. 12 illustrates use of the implants 10, 40, 65, and 70 and in particular the implant 10 to address a complex bone fracture involving a bone 160 with a multiple fracture 161 and a bone fragment 162. After securing the bone fragment 162 with the bone 160 using the implant 10 as previously set forth, a surgeon captures the multiple fracture 161 using a bone plate 163 secured atop the bone 160 using suitable fasteners, such as, for example bone screws, including over the implant 10 if necessary to achieve a desired capture of the multiple fracture 161.

Although the present invention has been described in terms of the foregoing preferred embodiments, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description; rather, it is defined only by the claims that follow.

What is claimed:

1. An orthopedic fixation system, comprising:
    an orthopedic implant transitionable between a natural shape and an insertion shape whereby a transition of the orthopedic implant from the natural shape to the insertion shape stores deliverable energy and a transition of the orthopedic implant from the insertion shape to the natural shape delivers stored energy, the orthopedic implant, comprising:
        a bridge with a first end and a second end, the bridge being deformable to move the orthopedic implant between the natural shape and the insertion shape,
        a claw comprising a first hook extending in a curve continuous from the first end of the bridge to a tip of the first hook and a second hook extending in a curve continuous from the first end of the bridge to a tip of the second hook, and
        an anchor extending from the bridge at the second end thereof; and
    the orthopedic implant when transitioned to the insertion shape being adapted to affix a bone fragment and a bone, whereby:
        the anchor is configured to implant in the bone,
        the bridge is configured to extend over the bone and the bone fragment to position the first hook and the second hook over the bone fragment exterior thereto, and
        the first hook and the second hook being configured to grasp and thereby capture the bone fragment exterior thereto such that, upon an attempted transition of the orthopedic implant from the insertion shape to the natural shape, the orthopedic implant being adapted to deliver the energy stored therein to the bone fragment and the bone thereby affixing the bone fragment with the bone.

2. The orthopedic fixation system of claim 1, the anchor, comprising a leg extending from the bridge at the second end thereof, the leg being configured to implant in the bone.

3. The orthopedic fixation system of claim 1, the anchor, comprising a first leg and a second leg extending from the bridge at the second end thereof, the first leg and the second leg being configured to implant in the bone.

4. The orthopedic fixation system of claim 1, the bridge, comprising a first span and a second span being spaced apart to define an opening therebetween.

5. The orthopedic fixation system of claim 4, the first span and the second span being connected at the first end of the bridge and at the second end of the bridge.

6. The orthopedic fixation system of claim 5, the first span and the second span each including a transition section therein, the transition section of the first span and the transition section of the second span respectively locating the first span and the second span in a natural form such that the orthopedic implant in the natural shape includes the claw comprising the first hook and the second hook and the anchor residing at a first distance, and the transition section of the first span and the transition section of the second span being deformable to store energy while moving respectively the first span and the second span from the natural form to an insertion form such that the orthopedic implant in the insertion shape includes the claw comprising the first hook and the second hook and the anchor residing at a second distance that is greater than the first distance.

7. The orthopedic fixation system of claim 6, the first span and the second span being configured to extend over the bone and the bone fragment to position the claw first hook and the second hook over the bone fragment exterior thereto such that, upon the transition section of the first span and the transition section of the second span attempting to transition respectively the first span and the second span from the insertion form to the natural form, the orthopedic implant in attempting to transition from the insertion shape to the natural shape being adapted to deliver the energy stored therein to the bone fragment and the bone thereby affixing the bone fragment with the bone.

8. The orthopedic fixation system of claim 6, the claw, comprising:
    the first hook extending from the bridge at the first end adjacent the first span thereof;
    the second hook extending from the bridge at the first end adjacent the second span thereof; and
    the first hook and the second hook being configured to grasp and thereby capture the bone fragment exterior thereto such that, upon the transition section of the first span and the transition section of the second span attempting to transition respectively the first span and the second span from the insertion form to the natural form, the orthopedic implant in attempting to transition from the insertion shape to the natural shape being adapted to deliver the energy stored therein to the bone fragment and the bone thereby affixing the bone fragment with the bone.

9. The orthopedic fixation system of claim 6, the anchor, comprising:
    a first leg extending from the bridge at the second end adjacent the first span thereof;
    a second leg extending from the bridge at the second end adjacent the second span thereof; and
    the first leg and the second leg being configured to implant in the bone.

10. An orthopedic fixation system, comprising:
    an orthopedic implant transitionable between a natural shape and an insertion shape whereby a transition of the orthopedic implant from the natural shape to the insertion shape stores deliverable energy and a transition of the orthopedic implant from the insertion shape to the natural shape delivers stored energy, the orthopedic implant, comprising:
        a bridge with a first end and a second end, the bridge being deformable to move the orthopedic implant between the natural shape and the insertion shape,
        a claw extending from the bridge at the first end thereof, and
        an anchor extending from the bridge at the second end thereof;
    the orthopedic implant when transitioned to the insertion shape being adapted to affix a bone fragment and a bone, whereby:
        the anchor is configured to implant in the bone,
        the bridge is configured to extend over the bone and the bone fragment to position the claw at the bone fragment, and the claw is configured to capture the bone fragment such that, upon an attempted transition of the orthopedic implant from the insertion shape to the natural shape, the orthopedic implant being adapted to deliver the energy stored therein to the bone fragment and the bone thereby affixing the bone fragment with the bone;

the bridge, comprising a first span and a second span spaced apart to define an opening therebetween, whereby the first span and the second span connect at the first end of the bridge and at the second end of the bridge;

the first span includes a transition section therein;

the second span includes a slot therein that divides the second span into a first span segment and a second span segment;

the first span at the transition section thereof being configured to close the first span segment and the second span segment whereby the first span and the second span are located in a natural form such that the orthopedic implant in the natural shape includes the claw and the anchor residing at a first distance; and the first span at the transition section thereof, during a deformation to store energy, being pivotable to open the first span segment and the second span segment whereby the first span and the second span move from the natural form to an insertion form such that the orthopedic implant in the insertion shape includes the claw and the anchor residing at a second distance that is greater than the first distance.

11. The orthopedic fixation system of claim 10, the first span and the second span being configured to extend over the bone and the bone fragment to position the claw at the bone fragment such that, upon the transition section of the first span attempting to transition the first span and the second span from the insertion form to the natural form, the orthopedic implant in attempting to transition from the insertion shape to the natural shape being adapted to deliver the energy stored therein to the bone fragment and the bone thereby affixing the bone fragment with the bone.

12. The orthopedic fixation system of claim 10, the claw, comprising:
a first hook extending from the bridge at the first end adjacent the first span thereof;
a second hook extending from the bridge at the first end adjacent the second span thereof; and
the first hook and the second hook being configured to capture the bone fragment such that, upon the transition section of the first span attempting to transition the first span and the second span from the insertion form to the natural form, the orthopedic implant in attempting to transition from the insertion shape to the natural shape being adapted to deliver the energy stored therein to the bone fragment and the bone thereby affixing the bone fragment with the bone.

13. The orthopedic fixation system of claim 10, the anchor, comprising a leg extending from the bridge at the second end, the leg being configured to implant in the bone.

14. An orthopedic fixation system, comprising:
an orthopedic implant transitionable between a natural shape and an insertion shape whereby a transition of the orthopedic implant from the natural shape to the insertion shape stores deliverable energy and a transition of the orthopedic implant from the insertion shape to the natural shape delivers stored energy, the orthopedic implant, comprising:
a bridge with a first end and a second end, the bridge being deformable to move the orthopedic implant between the natural shape and the insertion shape,
a claw extending from the bridge at the first end thereof, and
an anchor extending from the bridge at the second end thereof;

the orthopedic implant when transitioned to the insertion shape being adapted to affix a bone fragment and a bone, whereby:
the anchor is configured to implant in the bone,
the bridge is configured to extend over the bone and the bone fragment to position the claw at the bone fragment, and
the claw is configured to capture the bone fragment such that, upon an attempted transition of the orthopedic implant from the insertion shape to the natural shape, the orthopedic implant being adapted to deliver the energy stored therein to the bone fragment and the bone thereby affixing the bone fragment with the bone;

the bridge, comprising a first span and a second span spaced apart to define an opening therebetween;

the first span and the second span defining a slot therebetween at the first end of the bridge; and the first span and the second span being connected at the second end of the bridge.

15. The orthopedic fixation system of claim 14, the first span and the second span each including a transition section therein, the transition section of the first span and the transition section of the second span, due to the slot, independently locating, respectively, the first span and the second span in a natural form such that the orthopedic implant in the natural shape includes the claw and the anchor residing at a first distance, and the transition section of the first span and the transition section of the second span being deformable to store energy while, due to the slot, independently moving, respectively, the first span and the second span from the natural form to an insertion form such that the orthopedic implant in the insertion shape includes the claw and the anchor residing at a second distance that is greater than the first distance.

16. The orthopedic fixation system of claim 15, the first span and the second span being configured to extend over the bone and the bone fragment to position the claw at the bone fragment such that, upon the transition section of the first span and the transition section of the second span attempting to independently transition, respectively, the first span and the second span from the insertion form to the natural form, the orthopedic implant in attempting to transition from the insertion shape to the natural shape being adapted to deliver the energy stored therein to the bone fragment and the bone thereby affixing the bone fragment with the bone.

17. The orthopedic fixation system of claim 15, the claw, comprising:
a first hook extending from the bridge at the first end adjacent the first span thereof;
a second hook extending from the bridge at the first end adjacent the second span thereof; and
the first hook and the second hook being configured to capture the bone fragment such that, upon the transition section of the first span and the transition section of the second span attempting to independently transition, respectively, the first span and the second span from the insertion form to the natural form, the orthopedic implant in attempting to transition from the insertion shape to the natural shape being adapted to deliver the energy stored therein to the bone fragment and the bone thereby affixing the bone fragment with the bone.

18. The orthopedic fixation system of claim 15, the anchor, comprising a leg extending from the bridge at the second end, the leg being configured to implant in the bone.

19. The orthopedic fixation system of claim 18, the leg being non-linear whereby a first leg segment extends from the bridge at the second end thereof and a second leg segment extends from the first leg segment at an angle that locates the second leg segment beneath the bridge.

20. An orthopedic fixation system, comprising:
an orthopedic implant transitionable between a natural shape and an insertion shape whereby a transition of the orthopedic implant from the natural shape to the insertion shape stores deliverable energy and a transition of the orthopedic implant from the insertion shape to the natural shape delivers stored energy, the orthopedic implant, comprising:
a bridge with a first end and a second end, the bridge being deformable to move the orthopedic implant between the natural shape and the insertion shape,
a claw extending from the bridge at the first end thereof, and
an anchor extending from the bridge at the second end thereof;
the orthopedic implant when transitioned to the insertion shape being adapted to affix a bone fragment and a bone, whereby:
the anchor is configured to implant in the bone,
the bridge is configured to extend over the bone and the bone fragment to position the claw at the bone fragment, and
the claw is configured to capture the bone fragment such that, upon an attempted transition of the orthopedic implant from the insertion shape to the natural shape, the orthopedic implant being adapted to deliver the energy stored therein to the bone fragment and the bone thereby affixing the bone fragment with the bone;
an implant delivery device, comprising a handle with a shaft extending therefrom, the shaft terminating in an implant grip configured such that, upon transition of the orthopedic implant from the natural shape to the insertion shape, the implant grip engages the bridge thereby constraining the bridge and holding the orthopedic implant in the insertion shape while the claw and the anchor extend from the implant grip; and
the implant grip, comprising:
first and second side walls and first and second end walls defining a cavity having an entrance,
a first resilient retention tab extending from the first side wall into the cavity at the entrance thereof, and
a second resilient retention tab extending from the second side wall into the cavity at the entrance thereof.

21. The orthopedic fixation system of claim 20, wherein:
the first and second resilient retention tabs, upon a pushing of the implant grip against the bridge of the orthopedic implant transitioned to the insertion shape, being movable away from the entrance and into the cavity such that the bridge by-passes the first and second resilient retention tabs and enters the cavity whereby the first and second resilient retention tabs return from the cavity to the entrance thereby securing the bridge in the cavity and holding the orthopedic implant in the insertion shape while the claw and legs extend from the implant grip; and
the first and second resilient retention tabs, upon a pulling of the implant grip relative to the bridge of the orthopedic implant held by the implant grip in the insertion shape, being movable away from the entrance and the cavity such that the bridge by-passes the first and second resilient retention tabs and exits the cavity whereby the first and second resilient retention tabs return to the entrance of the cavity thereby releasing the orthopedic implant from the implant grip.

22. The orthopedic fixation system of claim 20, comprising a bone holding device including a claw, comprising:
a first hook and a second hook extending from opposite ends of a crosspiece such that the first hook and the second hook define a slot therebetween;
a first boss connected with the first hook, the first hook including a passage configured to receive therethrough a pin; and
a second boss connected with the second hook, the second boss including a passage configured to receive therethrough a pin.

23. The orthopedic fixation system of claim 22, wherein:
the crosspiece is configured to seat atop the bone;
the first hook and the second hook are configured to extend across the bone and the bone fragment and capture the bone fragment;
the first boss at the passage thereof is configured to receive a pin therethrough that secures the first hook with the bone fragment;
the second boss at the passage thereof is configured to receive a pin therethrough that secures the second hook with the bone; and
the first hook being secured with the bone fragment and the second hook being secured with the bone holds the bone fragment against the bone.

24. The orthopedic fixation system of claim 22, comprising a drill guide, comprising:
a handle;
a shank extending from the handle; and
a template extending from the shank that defines a guide hole, the template being configured to fit within the slot between the first and second hooks of the claw such that template positions the guide hole adjacent the crosspiece of the claw in order to locate the guide hole over the bone.

25. The orthopedic fixation system of claim 22, comprising a drill guide, comprising:
a handle;
a shank extending from the handle; and
a template extending from the shank that defines first and second guide holes, the template being configured to fit within the slot between the first and second hooks of the claw such that template positions the first and second guide holes adjacent the crosspiece of the claw in order to locate the first and second guide holes over the bone.

* * * * *